(12) United States Patent
Komiya et al.

(10) Patent No.: US 7,889,919 B2
(45) Date of Patent: Feb. 15, 2011

(54) IMAGE PROCESSING SYSTEM AND PHOTOGRAPHING APPARATUS FOR ILLUMINATING A SUBJECT

(75) Inventors: Yasuhiro Komiya, Hino (JP); Toru Wada, Niiza (JP); Osamu Konno, Iruma (JP); Takeyuki Ajito, Hachioji (JP); Tomoyuki Nakamura, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/834,133

(22) Filed: Jul. 12, 2010

(65) Prior Publication Data

US 2010/0277570 A1    Nov. 4, 2010

Related U.S. Application Data

(62) Division of application No. 10/521,778, filed as application No. PCT/JP03/09380 on Jul. 24, 2003, now Pat. No. 7,773,802.

(30) Foreign Application Priority Data

Jul. 26, 2002    (JP) .............................. 2002-218863

(51) Int. Cl.
G06K 9/00 (2006.01)
G03B 41/00 (2006.01)
G01J 3/40 (2006.01)
G01N 21/25 (2006.01)

(52) U.S. Cl. .................. 382/162; 382/128; 396/16; 396/14; 356/404; 356/406; 356/408

(58) Field of Classification Search .............. 382/128, 382/162; 396/14, 16; 356/404, 405, 406, 356/408; 348/222.1
See application file for complete search history.

(56) References Cited

U.S. PATENT DOCUMENTS 3,986,777 A    10/1976 Roll (Continued)

FOREIGN PATENT DOCUMENTS

DE    199 62 779 A1    6/2001

(Continued)

OTHER PUBLICATIONS

Related U.S. Appl. No. 10/521,779, filed Jan. 21, 2005.

(Continued)

*Primary Examiner*—Bhavesh M Mehta
*Assistant Examiner*—Mia M Thomas
(74) *Attorney, Agent, or Firm*—Holtz, Holtz, Goodman & Chick, PC

(57) ABSTRACT

An image processing system includes a photographing apparatus and a processing apparatus. The photographing apparatus includes LEDs for emitting light with characteristics of spectroscopic distributions varied in a visible light area, an image pick-up device unit which picks-up a subject image that is illuminated by the LEDs and is formed by an image pick-up optical system and which outputs an image signal, and a control unit. The control unit sequentially lights-on the LEDs upon an instruction for photographing a subject spectroscopic image being input from an operating switch, picks-up the image, and thus controls the operation for capturing subject spectroscopic images. The processing apparatus includes a calculating device which performs a desired image calculation based on the image signal.

18 Claims, 31 Drawing Sheets

U.S. PATENT DOCUMENTS

| | | |
|---|---|---|
| 4,011,571 A | 3/1977 | Okuzawa |
| 4,300,823 A | 11/1981 | Yamanaka et al. |
| 4,688,921 A | 8/1987 | Wakabayashi |
| 4,845,553 A | 7/1989 | Konomura et al. |
| 4,959,679 A | 9/1990 | Yamamoto et al. |
| 5,051,823 A | 9/1991 | Cooper et al. |
| 5,381,207 A | 1/1995 | Kazumi |
| 5,408,268 A | 4/1995 | Shipp |
| 5,503,559 A | 4/1996 | Vari |
| 5,523,786 A | 6/1996 | Parulski |
| 5,654,756 A | 8/1997 | Takahashi et al. |
| 5,690,486 A | 11/1997 | Zigelbaum |
| 5,766,006 A | 6/1998 | Murljacic |
| 5,995,763 A | 11/1999 | Posa et al. |
| 6,006,041 A | 12/1999 | Mizumaki et al. |
| 6,038,024 A | 3/2000 | Berner |
| 6,055,325 A | 4/2000 | Garini et al. |
| 6,111,650 A | 8/2000 | Rawicz et al. |
| 6,144,805 A | 11/2000 | Ogino |
| 6,201,880 B1 | 3/2001 | Elbaum et al. |
| 6,264,470 B1 | 7/2001 | Jung et al. |
| 6,276,933 B1 | 8/2001 | Melnyk et al. |
| 6,306,421 B1 | 10/2001 | Kunz et al. |
| 6,307,629 B1 | 10/2001 | Jung et al. |
| 6,341,957 B1 | 1/2002 | Momot et al. |
| 6,358,047 B2 | 3/2002 | Lehmann |
| 6,359,680 B1 | 3/2002 | Rubbert |
| 6,362,888 B1 | 3/2002 | Jung et al. |
| 6,381,017 B2 | 4/2002 | Jung et al. |
| 6,396,873 B1 | 5/2002 | Goldstein et al. |
| 6,413,207 B1 | 7/2002 | Minami |
| 6,414,750 B2 | 7/2002 | Jung et al. |
| 6,417,917 B1 | 7/2002 | Jung et al. |
| 6,431,870 B1 | 8/2002 | Sachdeva |
| 6,454,437 B1 | 9/2002 | Kelly |
| 6,540,513 B2 | 4/2003 | Berner et al. |
| 6,570,654 B2 | 5/2003 | Jung et al. |
| 6,600,832 B1 | 7/2003 | Nakayama et al. |
| 6,606,514 B2 | 8/2003 | Grass et al. |
| 6,650,834 B2 | 11/2003 | Ume |
| 6,672,868 B1 | 1/2004 | Momot et al. |
| 6,714,657 B1 | 3/2004 | Jacobs et al. |
| 6,721,009 B1 | 4/2004 | Iizuka |
| 6,749,310 B2 | 6/2004 | Pohlert et al. |
| 6,750,971 B2 | 6/2004 | Overbeck et al. |
| 6,776,614 B2 | 8/2004 | Wiechmann et al. |
| 6,807,297 B1 | 10/2004 | Tankovich et al. |
| 6,832,913 B2 | 12/2004 | Lehmann |
| 6,856,354 B1 | 2/2005 | Ohsawa |
| 6,870,616 B2 | 3/2005 | Jung et al. |
| 6,917,429 B2 | 7/2005 | Imura et al. |
| 6,940,545 B1 | 9/2005 | Ray et al. |
| 6,954,227 B2 | 10/2005 | Yoda |
| 6,964,567 B2 | 11/2005 | Kerschbaumer et al. |
| 6,967,644 B1 | 11/2005 | Kobayashi |
| 7,006,126 B2 | 2/2006 | Kerschbaumer et al. |
| 7,030,986 B2 | 4/2006 | Overbeck et al. |
| 7,033,172 B2 | 4/2006 | Hansen et al. |
| 7,058,213 B2 | 6/2006 | Rubbert et al. |
| 7,097,450 B2 | 8/2006 | Jung et al. |
| 7,106,511 B2 | 9/2006 | Grot et al. |
| 7,106,958 B2 | 9/2006 | Kerschbaumer et al. |
| 7,118,374 B2 | 10/2006 | Culp |
| 7,133,154 B2 | 11/2006 | Sugiyama |
| 7,136,093 B1 | 11/2006 | Itoh et al. |
| 7,142,312 B2 | 11/2006 | Quadling et al. |
| 7,144,248 B2 | 12/2006 | Irwin |
| 7,184,150 B2 | 2/2007 | Quadling et al. |
| 7,215,803 B2 | 5/2007 | Marshall |
| 7,255,558 B2 | 8/2007 | Babayoff et al. |
| 7,341,450 B2 | 3/2008 | Pye et al. |
| 7,342,668 B2 | 3/2008 | Quadling et al. |
| 7,355,633 B2 | 4/2008 | Kurosawa et al. |
| 7,355,721 B2 | 4/2008 | Quadling et al. |
| 7,393,209 B2 | 7/2008 | Lehmann |
| 7,490,294 B2 | 2/2009 | Okada |
| 7,538,878 B2 | 5/2009 | Jung et al. |
| 7,576,845 B2 | 8/2009 | Asakura et al. |
| 7,596,253 B2 | 9/2009 | Wong et al. |
| 7,682,150 B2 | 3/2010 | Jung et al. |
| 7,711,252 B2 * | 5/2010 | Konno et al. .................... 396/16 |
| 7,756,327 B2 * | 7/2010 | Komiya et al. ............... 382/162 |
| 7,773,802 B2 * | 8/2010 | Komiya et al. ............... 382/162 |
| 2002/0015933 A1 | 2/2002 | Berner et al. |
| 2002/0054208 A1 | 5/2002 | Goldstein et al. |
| 2002/0071124 A1 | 6/2002 | Schwarz |
| 2002/0080276 A1 | 6/2002 | Mori et al. |
| 2002/0099295 A1 | 7/2002 | Gil et al. |
| 2002/0102009 A1 | 8/2002 | Jones et al. |
| 2002/0114505 A1 | 8/2002 | Mahon et al. |
| 2002/0122119 A1 | 9/2002 | Takakura |
| 2002/0168784 A1 | 11/2002 | Sundrehagen et al. |
| 2002/0177751 A1 | 11/2002 | Ueno et al. |
| 2002/0191102 A1 | 12/2002 | Yuyama et al. |
| 2003/0011767 A1 | 1/2003 | Imura et al. |
| 2003/0107652 A1 | 6/2003 | Williams |
| 2003/0206279 A1 | 11/2003 | Kimura et al. |
| 2004/0076921 A1 | 4/2004 | Gofman et al. |
| 2004/0125996 A1 | 7/2004 | Eddowes et al. |
| 2004/0252303 A1 | 12/2004 | Giorgianni et al. |
| 2005/0026703 A1 | 2/2005 | Fukawa |
| 2005/0084144 A1 | 4/2005 | Feldman |
| 2005/0122518 A1 | 6/2005 | Overbeck et al. |
| 2005/0231592 A1 | 10/2005 | Cable et al. |
| 2005/0254704 A1 | 11/2005 | Komiya et al. |
| 2005/0256383 A1 | 11/2005 | Gandjbakhche et al. |
| 2006/0152586 A1 | 7/2006 | Komiya et al. |
| 2006/0251408 A1 * | 11/2006 | Konno et al. .................... 396/14 |
| 2006/0280360 A1 | 12/2006 | Holub |
| 2007/0031029 A1 | 2/2007 | Sasaki |
| 2007/0064119 A1 | 3/2007 | Komiya et al. |
| 2007/0270652 A1 * | 11/2007 | Morishita et al. ............ 600/178 |
| 2008/0192235 A1 | 8/2008 | Komiya et al. |
| 2008/0259336 A1 * | 10/2008 | Konno et al. ................. 356/404 |
| 2008/0284902 A1 * | 11/2008 | Konno et al. ................. 348/370 |
| 2008/0292295 A1 * | 11/2008 | Konno et al. .................... 396/16 |
| 2009/0067695 A1 | 3/2009 | Komiya et al. |
| 2009/0092297 A1 | 4/2009 | Kitoh et al. |
| 2009/0102964 A1 | 4/2009 | Yuyama et al. |
| 2009/0185712 A1 | 7/2009 | Wong et al. |
| 2009/0322868 A1 | 12/2009 | Ikeda |

FOREIGN PATENT DOCUMENTS

| | | |
|---|---|---|
| EP | 0 660 616 A2 | 6/1995 |
| EP | 1 072 884 A2 | 1/2001 |
| JP | 03-090123 A | 4/1991 |
| JP | 3-090128 A | 4/1991 |
| JP | 7-120324 A | 5/1995 |
| JP | 7-322103 A | 12/1995 |
| JP | 8-065690 A | 3/1996 |
| JP | 8-079770 A | 3/1996 |
| JP | 8-149352 A | 6/1996 |
| JP | 9-172649 A | 6/1997 |
| JP | 09-178564 A | 7/1997 |
| JP | 10-042302 A | 2/1998 |
| JP | 10-051796 A | 2/1998 |
| JP | 11-055444 A | 2/1999 |
| JP | 11-104061 A | 4/1999 |
| JP | 11-146265 A | 5/1999 |
| JP | 11-196301 A | 7/1999 |
| JP | 11-225953 A | 8/1999 |
| JP | 11-331493 A | 11/1999 |
| JP | 2000-152264 A | 5/2000 |

| | | | |
|---|---|---|---|
| JP | 2000-152269 A | 5/2000 | |
| JP | 2000-296114 A | 10/2000 | |
| JP | 2000-338950 A | 12/2000 | |
| JP | 2000-341499 A | 12/2000 | |
| JP | 2000-341681 A | 12/2000 | |
| JP | 2001-024971 A | 1/2001 | |
| JP | 2001-083009 A | 3/2001 | |
| JP | 2002-009879 A | 1/2002 | |
| JP | 2002-112960 A | 4/2002 | |
| JP | 2002-158948 A | 5/2002 | |
| JP | 2002-232769 A | 8/2002 | |
| JP | 2003-021859 A | 1/2003 | |
| JP | 2003-023643 A | 1/2003 | |
| JP | 2003-043559 A | 2/2003 | |
| JP | 2003-087806 A | 3/2003 | |
| JP | 2003-114462 A | 4/2003 | |
| JP | 2003-189068 A | 7/2003 | |
| JP | 2003-309856 A | 10/2003 | |
| JP | 2003-333608 A | 11/2003 | |
| WO | WO 00/50927 A2 | 8/2000 | |
| WO | WO 01/29542 A1 | 4/2001 | |
| WO | WO 01/55956 A1 | 8/2001 | |
| WO | WO 02/12847 A1 | 2/2002 | |
| WO | WO 2004/012461 A1 | 2/2004 | |
| WO | WO 2004/036162 A1 | 4/2004 | |

OTHER PUBLICATIONS

Related U.S. Appl. No. 12/264,056, filed Nov. 3, 2008.
Related U.S. Appl. No. 12/062,399, filed Apr. 3, 2008.
Related U.S. Appl. No. 12/141,778, filed Jun. 18, 2008.
Related U.S. Appl. No. 12/141,812, filed Jun. 18, 2008.
Japanese Office Action dated Dec. 22, 2009, and English translation thereof, issued in Japanese Application No. 2007-268275, which is a counterpart of related U.S. Appl. No. 11/486,455.
U.S. Office Action dated Dec. 9, 2009, issued in related U.S. Appl. No. 12/062,399.
Japanese Office Action dated Sep. 29, 2009, and English translation thereof, issued in Japanese Application No. 2007-268275, which is a counterpart of related U.S. Appl. No. 11/486,455.
Supplementary European Search Report dated Nov. 5, 2009, issued in European Application No. 03808856.3, which is a counterpart of related U.S. Appl. No. 12/062,399.
Japanese Office Action dated Sep. 24, 2008, and English translation thereof, issued in Japanese Application No. 2008-144542.
Japanese Office Action dated Apr. 1, 2008, and English translation thereof, issued in Japanese Application No. 2004-524134.
Karremann, R., "Farbmessung und Farbregelung in der Papierproduktion," Technisches Messen TM, R. Oldenbourg Verlag. Munchen, DE, vol. 59, No. 5, May 1, 1992, pp. 209-213.
Occupational Health Services—Dictionary Page: www.occupational-health-services.co.uk.html, pp. 1-7.
Related U.S. Appl. No. 11/486,455, filed Jul. 13, 2006.
Related U.S. Appl. No. 12/141,839, filed Jun. 18, 2008.
Japanese Office Action dated Aug. 3, 2010, and English translation thereof, issued in Japanese Application No. 2007-268274, which is a counterpart of related U.S. Appl. No. 11/486,455.
Japanese Office Action dated Apr. 13, 2010, and English translation thereof, issued in Japanese Application No. 2007-268274, which is a counterpart of related U.S. Appl. No. 11/486,455.

* cited by examiner

FIG.2
(A)
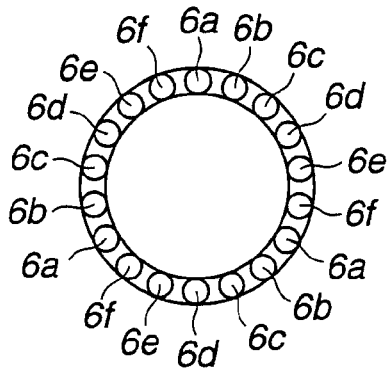
(B)
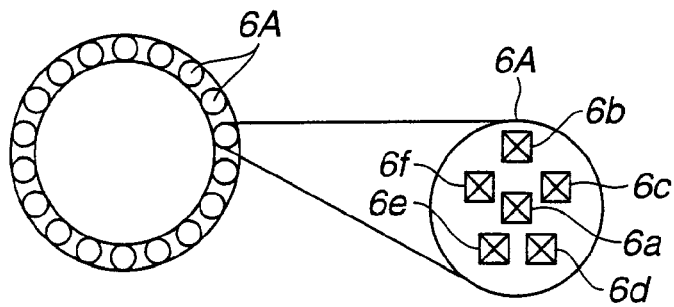
(C)
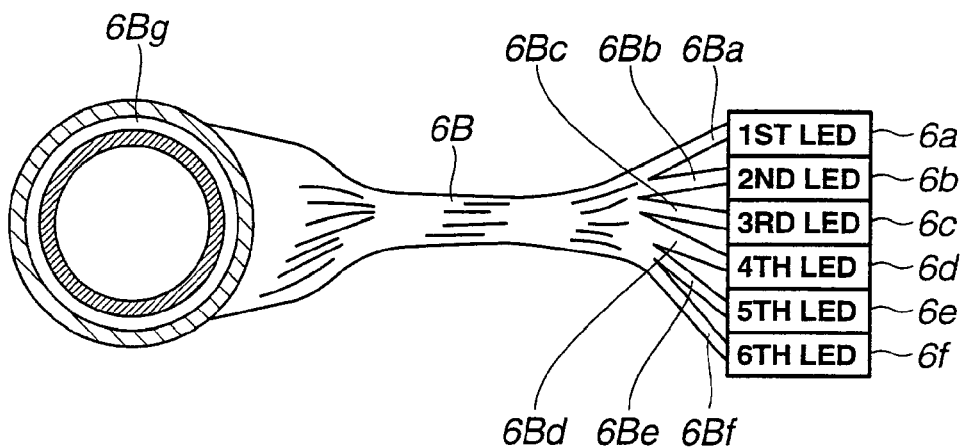

FIG. 10

| LED No. | PRIMARY COLOR No. | 1 LIGHT-ON ALL LEDS | 2 LIGHT-ON ONE LED | 3 LIGHT-ON ONE PRIMARY-COLOR LED | 4 LIGHT-ON LEDS GROUP | 5 LIGHT-ON B-LEDS GROUP | 6 LIGHT-ON G-LEDS GROUP | 7 LIGHT-ON R-LEDS GROUP | 8 LIGHT-ON ONE B-LEDS | 9 LIGHT-ON ONE G-LEDS | 10 LIGHT-ON ONE R-LEDS |
|---|---|---|---|---|---|---|---|---|---|---|---|
| 1 | 1 | ○ | ○ (EXAMPLE) | ○ | ○ | ○ | | | ○ | | |
| 2 | 2 | ○ | | (EXAMPLE) | ○ | ○ | | | | | |
| 3 | 3 | ○ | | | ○ | | ○ | | | ○ | |
| 4 | 4 | ○ | | | ○ | | ○ | | | | |
| 5 | 5 | ○ | | | ○ | | | ○ | | | ○ |
| 6 | 6 | ○ | | | ○ (EXAMPLE) | | | ○ | | | |
| 7 | 1 | ○ | | ○ | | ○ | | | ○ | | |
| 8 | 2 | ○ | | | | ○ | | | | | |
| 9 | 3 | ○ | | | | | ○ | | | ○ | |
| 10 | 4 | ○ | | | | | ○ | | | | |
| 11 | 5 | ○ | | | | | | ○ | | | ○ |
| 12 | 6 | ○ | | | | | | ○ | | | |
| 13 | 1 | ○ | | ○ | | ○ | | | ○ | | |
| 14 | 2 | ○ | | | | ○ | | | | | |
| 15 | 3 | ○ | | | | | ○ | | | ○ | |
| 16 | 4 | ○ | | | | | ○ | | | | |
| 17 | 5 | ○ | | | | | | ○ | | | ○ |
| 18 | 6 | ○ | | | | | | ○ | | | |

LIGHT-EMITTING MODE (EXAMPLE)

FIG.18
(A)
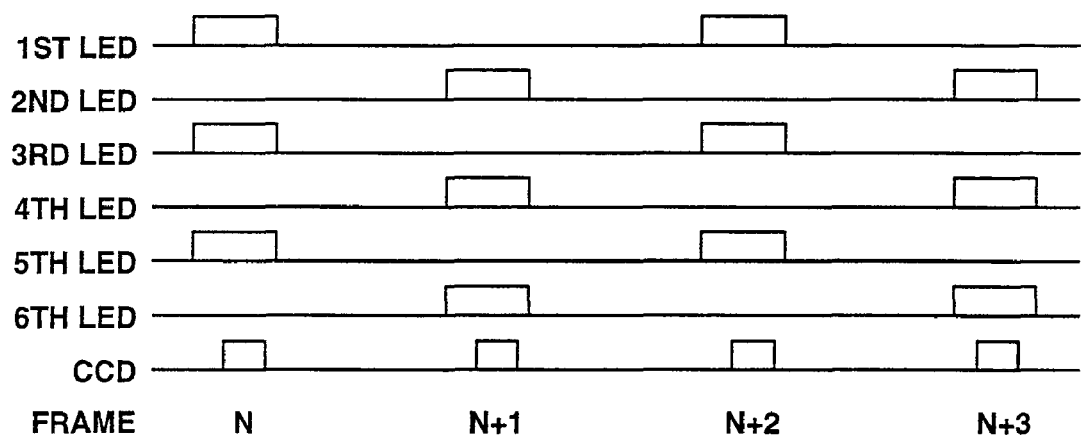
(B)
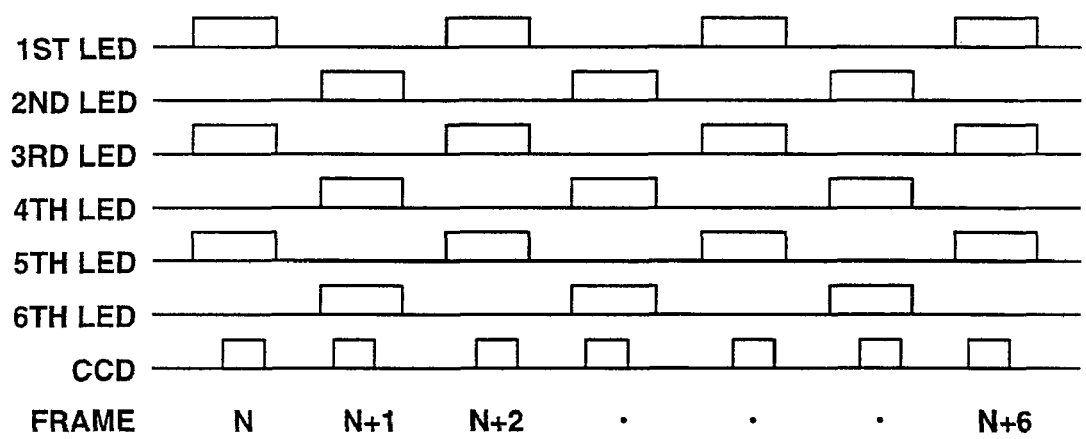

FIG.23
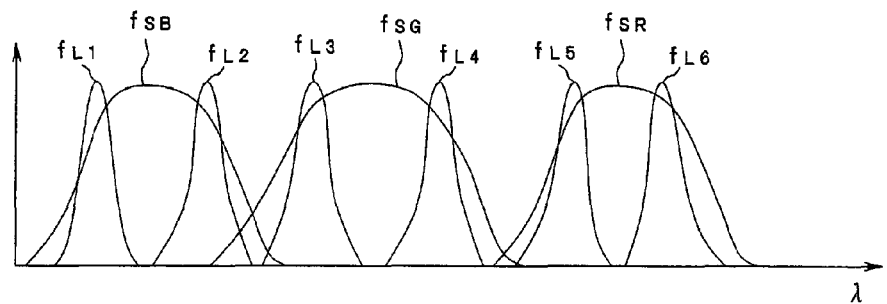
FIG.24
(A)
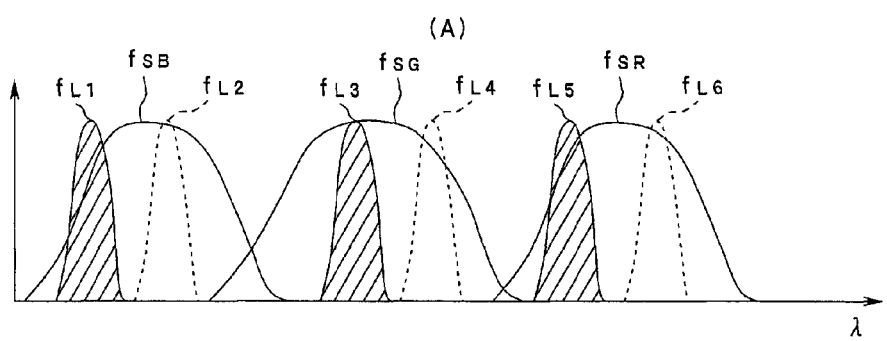
(B)
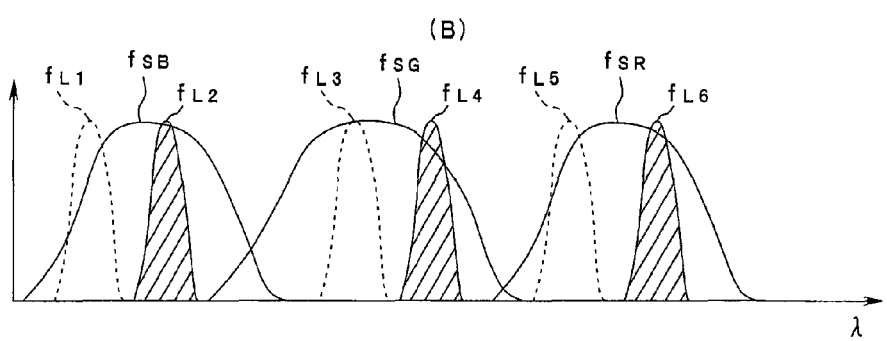
FIG.25
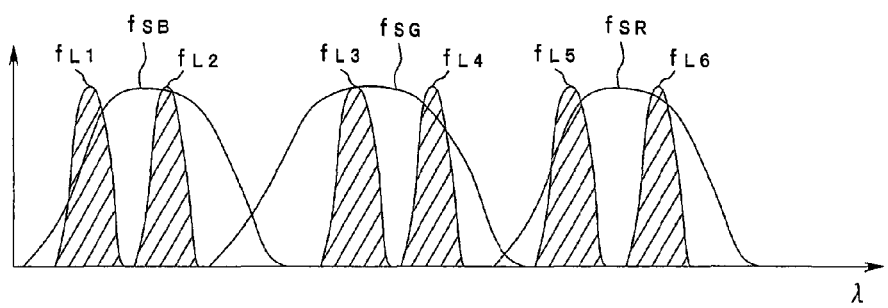

FIG.31
(A)
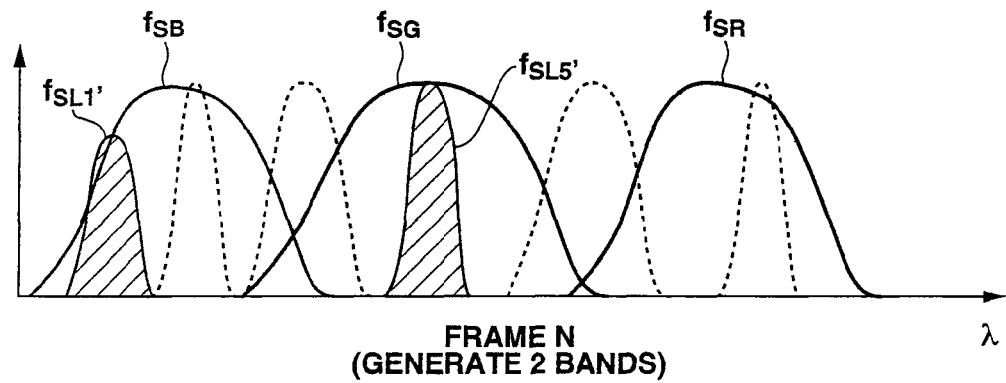
FRAME N
(GENERATE 2 BANDS)
(B)
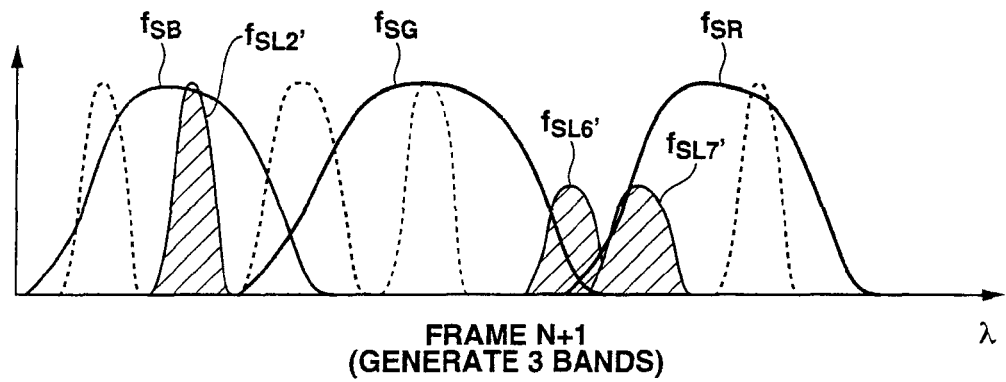
FRAME N+1
(GENERATE 3 BANDS)
(C)
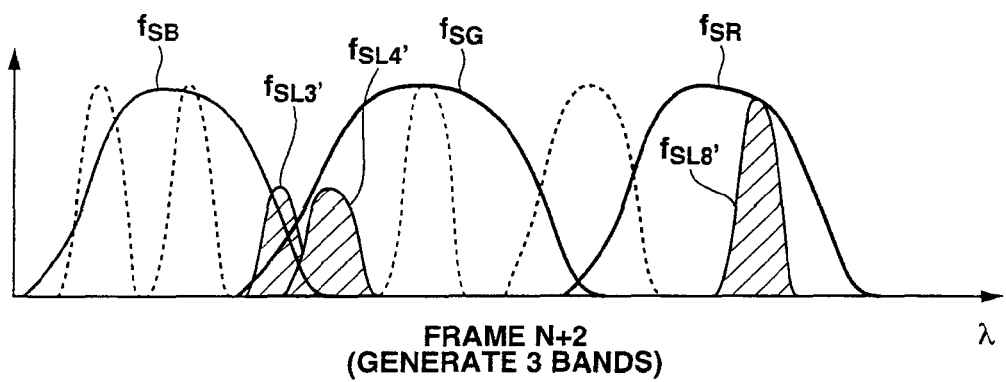
FRAME N+2
(GENERATE 3 BANDS)

IMAGE PROCESSING SYSTEM AND PHOTOGRAPHING APPARATUS FOR ILLUMINATING A SUBJECT

This is a Divisional Application of U.S. application Ser. No. 10/521,778, filed Jan. 21, 2005 now U.S. Pat. No. 7,773,802, which is a U.S. National Phase Application under 35 USC 371 of International Application PCT/JP03/09380, filed Jul. 24, 2003. The entire contents of U.S. application Ser. No. 10/521,778, filed Jan. 21, 2005 are incorporated herein by reference.

The present application is based upon and claims the benefit of priority from prior Japanese Patent Application No. 2002-218863, filed Jul. 26, 2002.

TECHNICAL FIELD

The present invention relates to an image processing system, and more particularly, to an image processing system which captures a spectroscopic image of a subject and performs the processing color reproduction of the subject with high precision.

BACKGROUND ART

Recently, the increase in concern over the beautification and health is confirmed. In the beatification, the whitening for suppressing the melanin pigment of the skin becomes a field of the trend for esthetic pursuit.

Conventionally, a camera system is used for the skin check which observes the skin surface on a monitor by enlarging it. The camera system for skin check is used in the dermatology, esthetic salon, beauty counseling, and the like. In the dermatology among them, the pecuriality of the skin surface is checked by observing an image of the crista cutis or sulcus cutis and then the counseling is performed.

For example, Japanese Unexamined Patent Application Publication No. 8-149352 discloses one camera for skin check. As disclosed in the Japanese Unexamined Patent Application Publication No. 8-149352, a skin observing apparatus comprises: a case having the opening in front thereof; an optical system having an optical axis as the center of the opening arranged in the case; a solid-state image pick-up device which forms an optical image from the optical system on an image pick-up surface; and a plurality of light-emitting devices which are arranged to illuminate a subject out of the opening via the opening from the inside of the case, have the light illumination in the direction to the opening, are arranged like a ring with the optical axis as the center, and have blue luminescent color.

Further, Japanese Unexamined Patent Application Publication No. 7-322103 discloses another camera for skin check comprising: a lens which is arranged in a case, facing an image pick-up window opened in front of a case main body; an image pick-up device which picks-up an optical image incident via the lens; a circular-line fluorescent lamp which is arranged in the case and illuminates the image pick-up window; a reflecting unit which adjusts an advancing angle by the reflection upon guiding illuminating light from the circular-line fluorescent lamp; a transparent sliding pipe which is arranged coaxially to the image pick-up window in the case with the same diameter as that of the circumference of the image pick-up window and is freely movable in the axial direction; and a shading ring unit which is attached to a part of the transparent sliding pipe and realizes a first state and a second state. The first state permits the passage of the illuminating light from the circular-line fluorescent lamp via a transparent portion of the transparent sliding pipe in response to the movement of the transparent sliding pipe in the axial direction and which prohibits the passage of the illuminating light from the circular-line fluorescent lamp via the reflecting unit. Further, the second state permits the passage of the illuminating light from the circular-line fluorescent lamp via the reflecting unit and which prohibits the passage of the illuminating light from the fluorescent lamp of the image pick-up window via the transparent sliding pipe.

The dentistry needs to finish the color with the sense of comfort to the patient teeth in the case of creating a prosthetic tooth. Generally, data on the teeth color is obtained with the subjectivity by the direct comparison with the patient teeth color by using a shading guide.

In addition to the dermatology and the dentistry, the paint color of a vehicle and a building, the spectroscopic characteristics of food, and the dyeing of cloths require a technology for reproducing the color of the subject with accuracy for the purpose of using on the diagnosis, examination, confirmation, and determination.

As one conventional technology for reproducing the color with high accuracy, Japanese Unexamined Patent Application Publication No. 2000-152269 discloses a color reproducing system in which multi-band image data is captured by picking-up an image of a subject under exterior lighting with many spectroscopic filters arranged on a rotary filter turret and further the color is reproduced by estimating the spectroscopic spectrum of the subject with high accuracy.

However, the color reproducing system disclosed in the Japanese Unexamined Patent Application Publication No. 2000-152269 is used to obtain spectrum data of the subject in a laboratory or the like, with the heavy weight in the fixing type, and needs another illuminating sensor which is used for the color reproduction with the exterior lighting. However, the above-mentioned fields of users, for whom the compact size, light weight, and handy property are necessary for the operation, do not satisfy with the conventional color reproducing system.

The dermatology conventionally uses a handy-type image processing system that does not obtain the multi-band data. Therefore, the handy-type image processing system does not satisfy the need for color reproduction with high precision.

It is an object of the present invention to provide a mobile image processing system for reproducing the color with the high precision and with the compact size and light weight.

SUMMARY OF THE INVENTION

According to a first aspect of the invention, a photographing apparatus includes: a plurality of light-emitting devices for illuminating a subject and emitting illumination light having characteristics of spectroscopic distributions varied in at least a visible light range; an image pick-up optical system which forms a subject image of a subject illuminated by the light-emitting device; an image pick-up device unit which picks-up the subject image formed by the image pick-up optical system and outputs an image signal; and a control unit which controls lighting-on of the plurality of light-emitting devices and image picking-up by the image pick-up device unit.

In addition, according to the first aspect of the invention, the photographing apparatus is configured two switch between a spectroscopic image capturing mode for capturing multi-band spectroscopic still images of the subject and a moving image capturing mode for capturing a moving image.

In the spectroscopic image capturing mode, the control unit controls the plurality of light emitting devices to sequentially light-on according to the characteristics of spectroscopic distributions, and controls the image pick-up device unit to perform the image picking-up a plurality of times synchronously with the lighting-on of the light emitting devices to capture multi-band sequential spectroscopic images of the subject.

In the moving image capturing mode, the control unit one of: (i) controls light emitting devices of a single specific primary color or a plurality of specific primary colors selected from the plurality of light emitting devices to light-on sequentially or simultaneously, and (ii) controls a plurality of groups of the light-emitting devices to sequentially light-on group by group, the groups including light-emitting devices having different characteristics of spectroscopic distributions selected from the plurality of light-emitting devices, and the control unit controls the image pick-up device unit to capture a moving image.

According to a second aspect of the invention, in the first aspect, the control unit performs the control by using groups necessary for application in the plurality of groups of the light-emitting devices which respectively comprise the plurality of the light-emitting devices.

According to a third aspect of the invention, in the first aspect, the moving image capturing mode is a mode for capturing a three-primary-color moving image by the image pick-up device unit by sequentially lighting-on groups of the light-emitting devices for every image pick-up frame in the group of the light-emitting devices including a group of the light-emitting devices of blue in the visible light area, a group of the light-emitting devices of red in the visible light area, and a group of the light-emitting devices of green in the visible light area, from among the plurality of light-emitting devices.

According to a fourth aspect of the invention, in the second aspect, the photographing apparatus further includes a photographing operating unit which inputs at least an instruction for starting a spectroscopic image photographing operation, wherein the control unit controls the operation for capturing the plurality of subject spectroscopic images in accordance with the input of the instruction for starting the spectroscopic image photographing operation from the photographing operating unit.

According to a fifth aspect of the invention, in the fourth aspect, the photographing operating unit includes a pressing button switch, and the control unit controls the operation for changing the group upon pressing of the button switch.

According to a sixth aspect of the invention, in the fifth aspect, the control unit controls light-on timings of the devices of the changed group, upon pressing of the button switch.

According to a seventh aspect of the invention, in the fourth aspect, the photographing operating unit includes a pressing button switch, and the control unit controls the switching of the spectroscopic image capturing mode and the moving image capturing mode.

According to an eighth aspect of the invention, in the first aspect, the image pick-up device unit includes a color image pick-up device having a color filter array.

According to a ninth aspect of the invention, in the eighth aspect, at least one of the plurality of light-emitting devices has characteristics of spectroscopic distributions between different bands of the color filter array.

According to a tenth aspect of the invention, in the first aspect, the photographing apparatus further includes a display unit for displaying an image based on the image signal outputted from the image pick-up device unit.

According to an eleventh aspect of the invention, in the first aspect, the photographing apparatus further includes an abutting portion which is abutted to the subject at one end thereof.

According to a twelfth aspect of the invention, in the eleventh aspect, the abutting portion includes a flexible material with a cylindrical shape.

According to a thirteenth aspect of the invention, in the eleventh aspect, the abutting portion includes a material which rejects or reduces influence from ambient light.

According to a fourteenth aspect of the invention, in the eleventh aspect, the abutting portion is detachably coupled to a casing of the photographing apparatus.

According to a fifteenth aspect of the invention, an image processing system includes the photographing apparatus of the first aspect of the invention, and further includes a processing apparatus including a calculating unit which performs a desired image calculation based on the image signal.

According to a sixteenth aspect of the invention, in the fifteenth aspect, the calculating unit includes a color-reproduction calculating unit for calculating image data for displaying an image of the subject which is color-reproduced based on the spectroscopic still images photographed by the photographing apparatus.

According to a seventeenth aspect of the invention, in the sixteenth aspect, the calculating unit further includes an input profile calculating unit for generating an input profile using at least one of the characteristics of spectroscopic distributions of the light-emitting devices, and characteristics data of the image pick-up optical system and the image pick-up device unit, and the color-reproducing calculating unit comprises an XYZ estimation calculating unit for generating image data of XYZ tristimulus values from the spectroscopic still images using the input profile and a color matching function.

According to an eighteenth aspect of the invention, in the fifteenth aspect, the calculating unit further includes an image determination calculating unit which determines or analyzes the subject based on the spectroscopic still images and outputs a result of the determining or analyzing.

BRIEF DESCRIPTION OF THE DRAWINGS

FIG. 2 is a diagram showing an example of the arrangement and an example configuration of LEDs according to the first embodiment;

FIG. 10 is a diagram showing an example for a lighting-on method when three LEDs are arranged for each of six primary colors according to the first embodiment;

FIG. 18 is a timing chart showing reading states in a full mode and a reading double-speed mode according to the second embodiment;

FIG. 23 is a graph showing the light-emitting spectrums of the LEDs and the spectroscopic sensitivity characteristics of a CCD passing through a color filter array according to the third embodiment;

FIG. 24 is a graph showing the spectroscopic characteristics of spectroscopic images of the frames upon creating 6-band spectroscopic images according to the third embodiment;

FIG. 25 is a graph showing the spectroscopic characteristics of the spectroscopic images of the frames upon creating a monitoring image according to the third embodiment;

FIG. 31 is a graph showing the spectroscopic characteristics of the spectroscopic images of frames, upon creating the 8-band spectroscopic images according to the third embodiment;

BEST MODE FOR CARRYING OUT THE INVENTION

Hereinbelow, a description is given of embodiments of the present invention with reference to the drawings.

Figure 1:
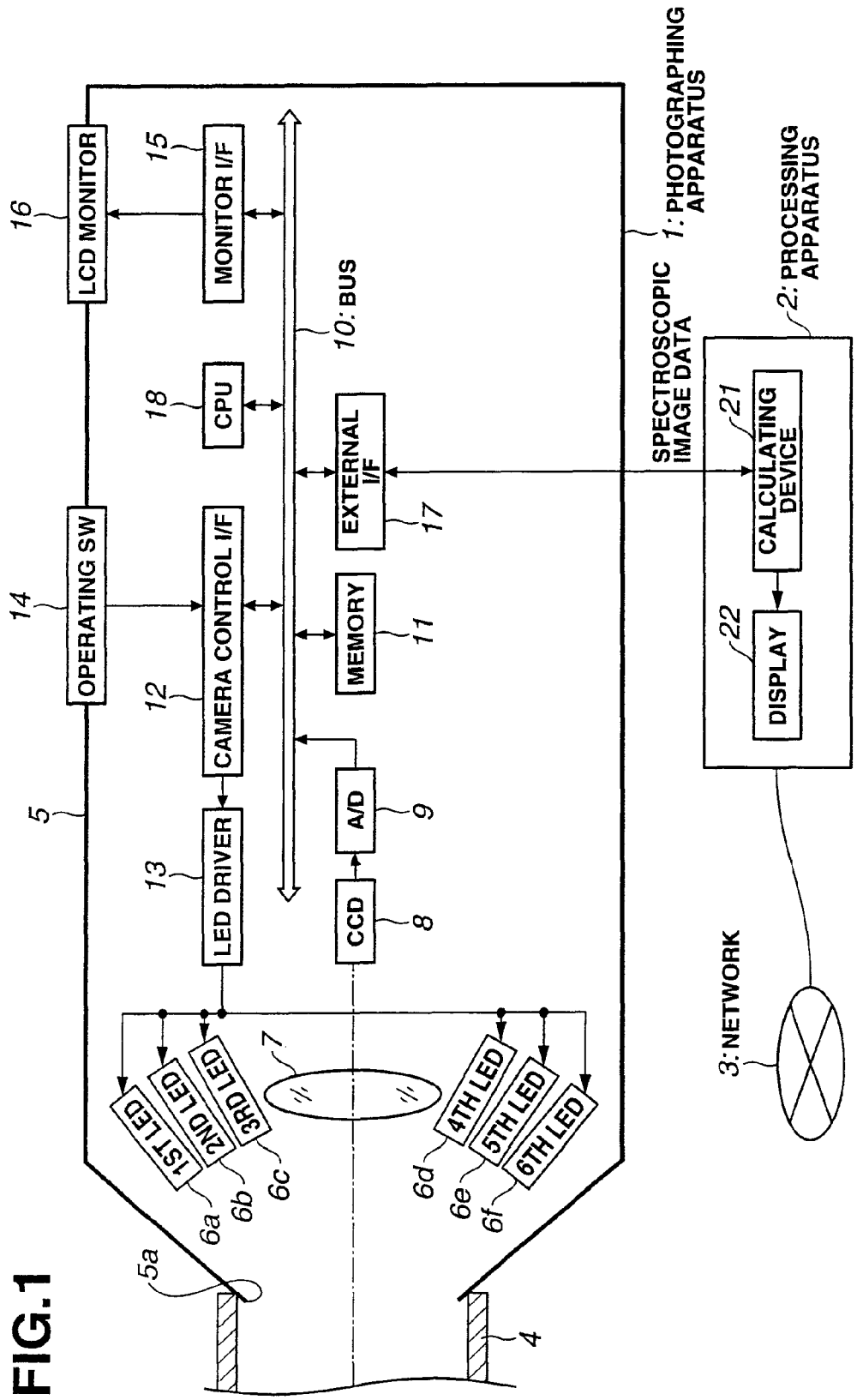
FIG. 1 is a block diagram showing the configuration of an image processing system according to a first embodiment of the present invention.

FIGS. 1 to 16 relate to a first embodiment, FIG. 1 is a block diagram showing the configuration of an image processing system.

The image processing system comprises: a photographing apparatus 1 which can take a picture of a subject spectroscopic image by illuminating a subject with illuminating light having a plurality of independent varying wavelength bands in a visible light area; and a processing apparatus 2 which is connected to the photographing apparatus 1 and processes the subject spectroscopic image outputted from the photographing apparatus 1. The processing apparatus 2 is connected to a network 3 if necessary.

In the photographing apparatus 1 according to the first embodiment, the image pick-up operation of a still image and the image pick-up operation of a moving image are performed. That is, in the image pick-up operation of the still image, illuminating light having six types of wavelength bands (six primary-color illuminating light) is sequentially irradiated to the subject, and six subject-spectroscopic-images are captured as the still images. In the image pick-up operation of the moving image, at least one piece of illuminating light is selected from the six primary-color illuminating light, three R-, G-, and B-illuminating light is set and is sequentially irradiated, and the images are captured as a surface-sequential moving image.

Further, the photographing apparatus 1 comprises: a casing 5 having a projecting port 5a which projects the illuminating light, as will be described later, and on which reflecting light from the subject is incident; an abutting portion 4 which is detachably attached to the projecting port 5a of the casing 5 and is cylindrically-shaped, containing a material with the flexibility for shielding so as to prevent the mixing the ambient light and the illuminating light projected to the subject via the projecting port 5a; first to sixth LEDs 6a to 6f serving as light-emitting devices which are built-in the casing 5 and emit the illuminating light by the light-on so as to illuminate the subject; an image pick-up optical system 7 which is built-in the casing 5 and creates a subject image illuminated by the first to sixth LEDs 6a to 6f; a CCD 8 serving as an image pick-up device, included in an image pick-up device unit which picks-up the subject image formed by the image pick-up optical system 7 and outputs an image signal; an A/D converter 9 which converts an analog signal outputted from the CCD 8 into a digital signal; a memory 11 which temporarily stores the subject spectroscopic image outputted from the A/D converter 9 and transmitted via a bus 10, as will be described later, and which is used as a working area of a CPU 18 as will be described later; an operating switch 14 serving as a photographing operating unit, including various operating switches and operating buttons for inputting a starting instruction of the spectroscopic image photographing operation and inputting a starting or ending instruction of the moving image photographing operation; a camera control I/F 12 which transmits the instructing input from the operating switch 14 to the CPU 18, as will be described later, issues a command for the control of light emission of the first to sixth LEDs 6a to 6f based on the instruction from the CPU 18, and controls the image pick-up operation of the photographing apparatus 1; an LED driver 13 which controls the light emission of a light-emission starting timing and a light-emission ending timing of the first to sixth LEDs 6a to 6f based on the instruction from the camera control I/F 12; a monitor I/F 15 which controls the operation for displaying, on an LCD monitor 16 which will be described later, the subject spectroscopic images (still images) stored in the memory 11 or the moving image picked-up by the CCD 8; the LCD monitor 16 which displays the image outputted form the monitor I/F 15; an external I/F 17 which outputs, to the processing apparatus 2, the subject spectroscopic images stored in the memory 11 and control data from the processing apparatus 2 or inputs communication data from the processing apparatus 2; and the CPU 18 serving as a control unit which systematically controls the photographing apparatus 1 including the A/D converter 9, the memory 11, the camera control I/F 12, the monitor I/F 15, the external I/F 17, the CPU 18 which will be described later, and the above-mentioned circuits.

The processing apparatus 2 comprises: a calculating device 21 which comprises, e.g., a personal computer or the like, receives the subject spectroscopic image outputted from the external I/F 17, calculates three XYZ excitation values by using an input profile as will be described later, and generates a display signal for obtaining, from a display 22 that will be described later, substantially the same three XYZ excitation values as the three XYZ excitation values presumed to be given by the subject with a display profile based on the calculated three XYZ excitation values; and the display 22 which displays the image on which the colors are reproduced at the high fidelity level by using the display signal outputted from the calculating device 21. Although not shown, the processing apparatus 2 comprises a network interface for connecting to the network 3 and the like.

Incidentally, the photographing apparatus 1 and the processing apparatus 2 may be connected by wiring. Alternatively, the photographing apparatus 1 and the processing apparatus 2 may be connected by radio frequency using Bluetooth or radio LAN or may be integrally configured.

Figure 3:
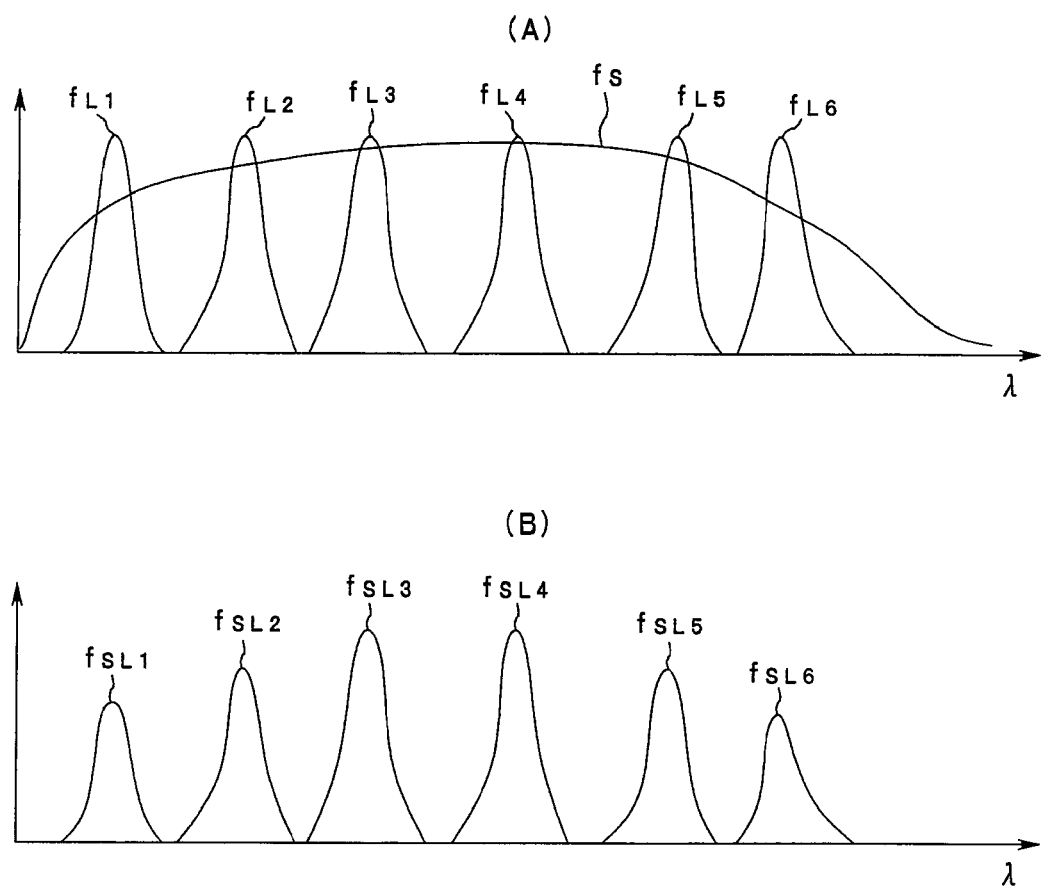
FIG. 3 is a graph showing spectroscopic sensitivity characteristics of a CCD, light-emitting spectrums of the LEDs, and spectroscopic characteristics of them according to the first embodiment.

FIG. 3 is a graph showing the spectroscopic sensitivity characteristics of the CCD 8, the light-emitting spectrums of the first to sixth LEDs 6a to 6f, and the spectroscopic characteristics thereof.

Referring to FIG. 3(A), the first to sixth LEDs 6a to 6f serving as the light-emitting devices have varied independent light-emitting spectrums. The light of the first LED 6a shown by a curve fL1 is blue having the small amount of violet, for example. The light of the second LED 6b shown by a curve fL2 is blue having the small amount of green, for example. The light of the third LED 6c shown by a curve fL3 is green having the small amount of blue, for example. The light of the fourth LED 6d shown by a curve fL4 is green having the small amount of yellow, for example. The light of the fifth LED 6e shown by a curve fL5 is orange, for example. The light of the sixth LED 6f shown by a curve fL6 is red, for example.

In the shown example, the light-emitting spectrums of the first to sixth LEDs 6a to 6f are completely separated without overlaying each other. However, the light-emitting spectrums of the first to sixth LEDs 6a to 6f may be partly overlaid. Further, the number of types of LEDs is not limited to six and an arbitrary number of types of LEDs may be properly combined.

The spectrums of the illuminating light of the LEDs may be arrayed at an equal wavelength interval (at which peaks, for example, are aligned at an equal interval in the wavelength direction), at an equal wavelength ratio interval (at which the peaks or the like are aligned at a predetermined ratio interval in the wavelength direction), at a specific array for specific purpose (by which the peaks or the like are specifically aligned in the wavelength direction for the specific purpose), by the setting to be sequentially multiplying a specific wavelength-color (by which the peaks or the like are aligned at the position for sequentially multiplying the wavelength by using the specific wavelength as a basic wavelength), by the arrangement of a specific polarizing color (by which the blight expressed by the peaks aligned in the wavelength direction is polarized in the specific direction), or by the arrangement of light extended to outside the visible light area (by which the light expressed by the peaks aligned in the wavelength direction reaches an area outside the visible light area). The spectrum alignment matching the using purpose may be selected.

The light-emitting device uses the LED serving as a semiconductor light-emitting device with high luminance that is light in weight, compact in size, and is easily obtained because of its relatively inexpensive price. However, the light-emitting device is not limited to this and may be a semiconductor laser such as an LD (laser diode) or another light-emitting device.

According to the first embodiment, the CCD 8 is a monochrome-type one. As shown by a curve fS in FIG. 3(A), the sensor sensitivity entirely covers the visible light area. The image pick-up device uses a monochrome-type CCD. However, the image pick-up device is not limited to this and may use a color-type CCD as will be described later, a CMOS-type CCD, or other image pick-up devices.

Referring to FIG. 3(B), curves fSL1 to fSL6 show the spectroscopic sensitivity characteristics, when the CCD 8 receives the light of the subject images illuminated by the first to sixth LEDs 6*a* to 6*f*. The difference of wavelengths having the total spectroscopic sensitivity characteristics is electrically processed later or is corrected as the input profile of the photographing apparatus 1.

FIG. 2 is a diagram showing an example configuration and an example of the arrangement of the LEDs.

Referring to FIG. 2(A), the first to sixth LEDs 6*a* to 6*f* comprise six primary colors. Three sets of the first to sixth LEDs 6*a* to 6*f* (three sets for each color) are sequentially arranged like a ring. The arranging sequence shown in FIG. 2(A) is one example, the present invention is not limited to this and can be widely applied to an arbitrary arrangement such as inverse sequence and random arrangement.

Referring to FIG. 2(B), a plurality of light-emitting portions 6A are arranged like a ring. The first to sixth LEDs 6*a* to 6*f* are arranged such that the light-emitting portions 6A include the six primary colors. In the example shown in FIG. 2(B), one light-emitting portion 6A includes all the six primary colors, but the present invention is not limited to this and the six primary colors are separately arranged to a plurality of light-emitting portions 6A, e.g., three primary colors are arranged to the two light-emitting portions 6A.

Referring to FIG. 2(C), one ends 6Ba to 6Bf of a fiber bundle 6B are connected to the first to sixth LEDs 6*a* to 6*f* and the other end 6Bg of the fiber bundle 6B is formed like a ring. Thus, the illuminating light emitted from the first to sixth LEDs 6*a* to 6*f* is incident on the bundle fiber ends 6Ba to 6Bf. The bundle fiber end comprises a plurality of fine fibers. At an emitting portion 6Bg of the bundle fiber, the fine fibers of the LEDs are mixed and thus the light is irradiated to the subject by using the fibers as an even light source like a ring. The influence of total reflection from the subject is suppressed.

The arrangement of the LEDs is not limited to the examples shown in FIG. 2. As long as the CCD 8 does not disturb the image pick-up operation, the arrangement of the LEDs can may be like a ring one, cross one, rectangular one, random one, and another proper one.

Next, a description is given of two image capturing modes in the photographing apparatus 1.

As mentioned above, the photographing apparatus 1 picks-up the moving image as the normal RGB images and the still image as the subject spectroscopic images of the six primary colors for reproducing the color at the high fidelity level. In a capturing mode of a monitoring image, the moving image is picked-up. In a capturing mode of a spectroscopic image, the still image is picked-up.

The two modes are switched by pressing a photographing button 14*a* (refer to FIG. 16) comprising a pressing button switch included in the operating switch 14.

That is, the capturing mode of the monitoring image is automatically set by switching-on a power switch, and the subject image is displayed on the LED monitor 16 as the moving image. In this state, the portion in the subject for photographing the spectroscopic image is searched and the photographing apparatus 1 is positioned. Thus, the portion in the subject to be photographed is within the image pick-up range and the photographing apparatus 1 is positioned. By pressing the photographing button 14*a* (refer to FIG. 16), the capturing mode of the monitoring image is switched to the capturing mode of the spectroscopic image and the subject spectroscopic image is captured as the still image.

After capturing the subject spectroscopic image, the mode is returned to the capturing mode of the monitoring image and the portion in the subject for next capturing spectroscopic image is searched.

Although not shown, a result of analyzing the spectroscopic image or the color reproduction using the captured spectroscopic image is displayed on the LCD monitor 16 or the display 22 by another setting just after capturing the spectroscopic image.

Figure 4:
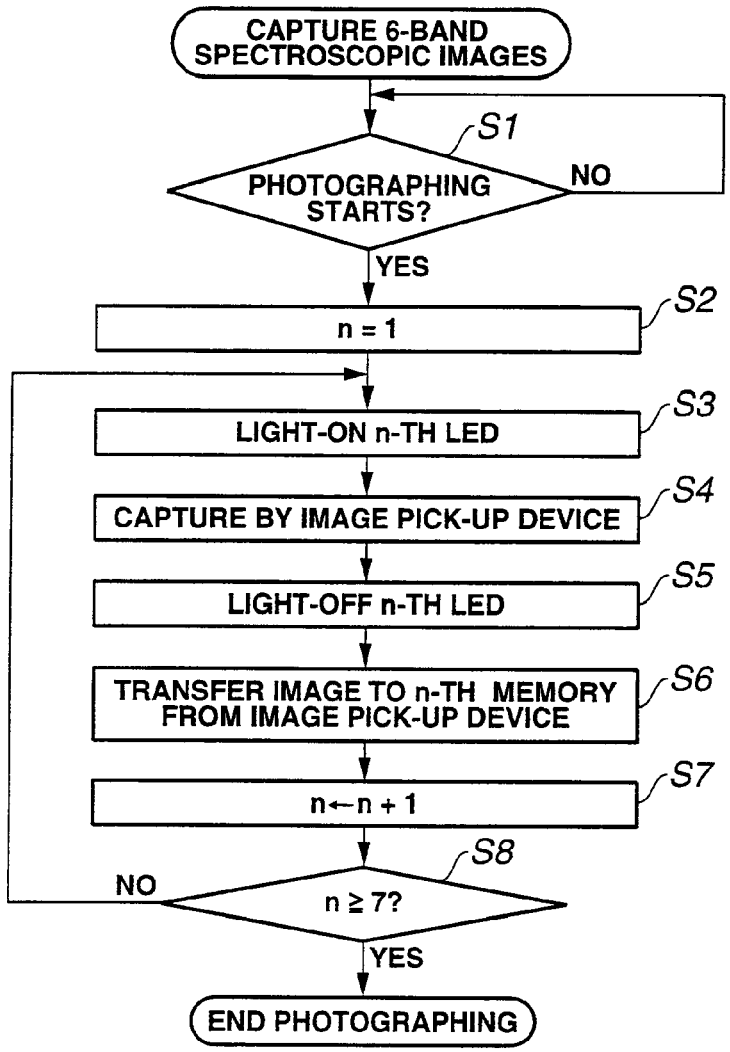
FIG. 4 is a flowchart showing the operations of the light emission of the LEDs for capturing 6-band spectroscopic images and the image capturing by an image pick-up device according to the first embodiment.
Figure 5:
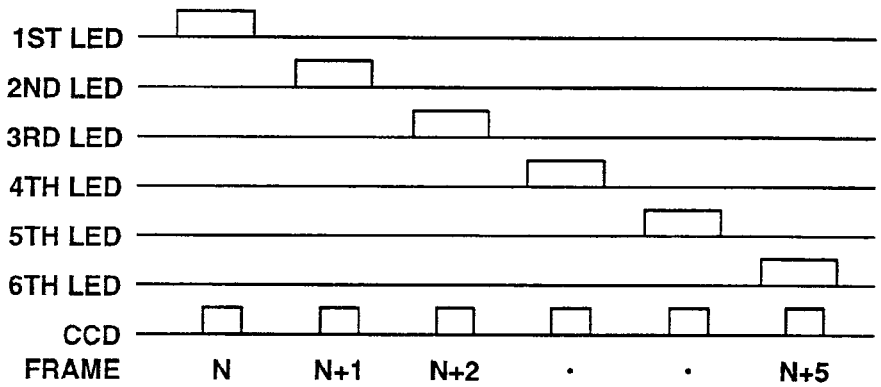
FIG. 5 is a timing chart showing a state of the operations of the light emission of the LEDs and the image capturing by the image pick-up device upon capturing the 6-band spectroscopic images according to the first embodiment.
Figure 6:
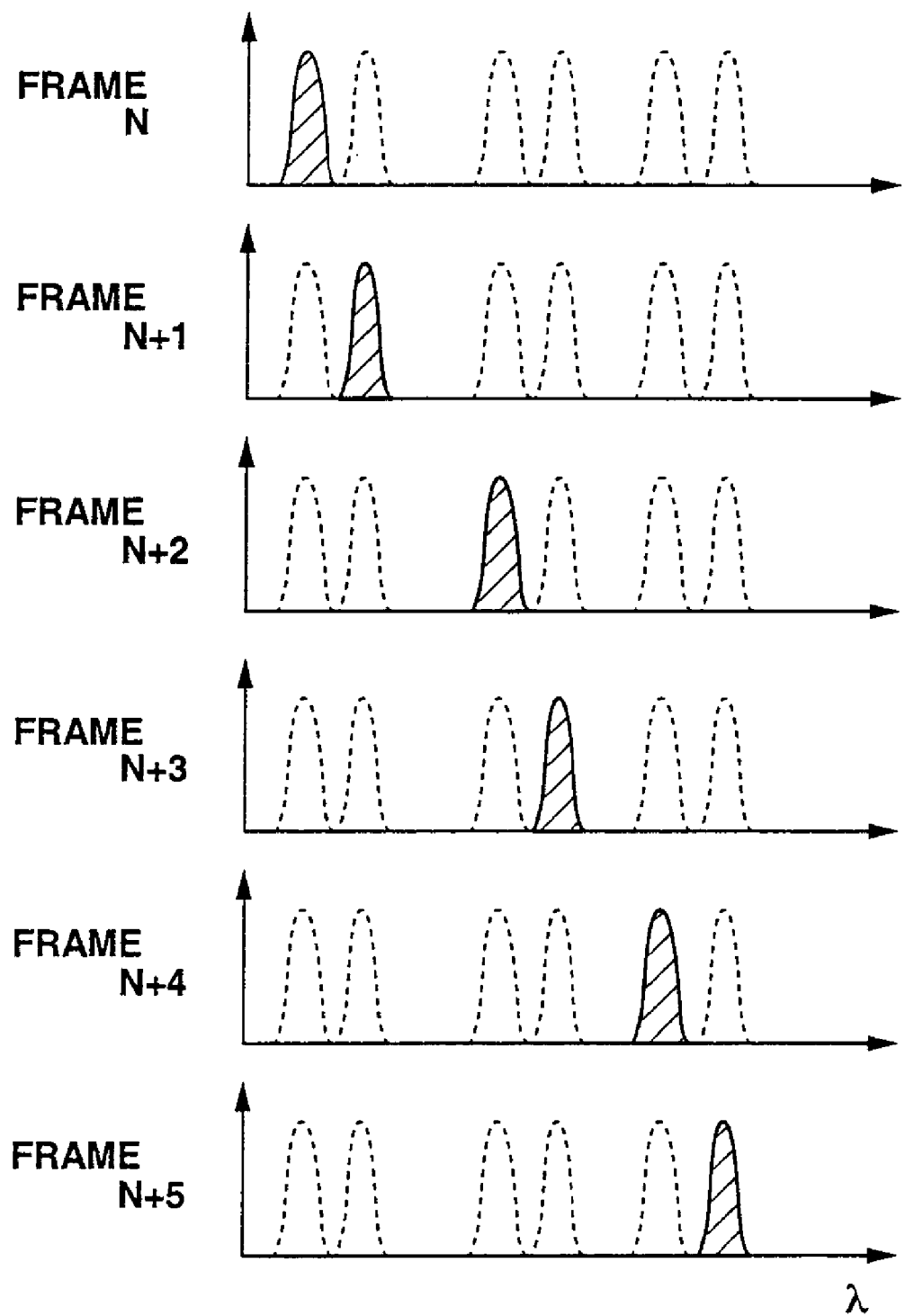
FIG. 6 is a graph showing band characteristics of frames in the operation for capturing the 6-band spectroscopic images according to the first embodiment.

Next, a description is given of the operation of the capturing mode of the spectroscopic image in the image processing system with reference to FIGS. 4 to 6. FIG. 4 is a flowchart showing the operations for light emission of LEDs and for image capturing by the image pick-up device upon capturing the 6-band spectroscopic images. FIG. 5 is a timing chart showing a state of the operations for light emission of the LEDs and for image capturing by the image pick-up device upon capturing the 6-band spectroscopic images. FIG. 6 is a graph showing the band characteristics of the frames upon capturing the 6-band spectroscopic images.

By pressing the photographing button 14*a* (refer to FIG. 16), the capturing mode of the monitoring image is switched to the capturing mode of the spectroscopic image and then it is determined whether or not the image pick-up operation of the spectroscopic image starts (step S1). When the image pick-up operation of the spectroscopic image promptly starts by pressing the photographing button 14*a*, the determination may not be performed. However, when the photographing button 14*a* comprises a two-step pressing button and adjusts the focusing or the amount of exposure at the first pressing step serving as half pressing and starts the exposure at the second pressing step serving as the complete pressing, in step S1, it is determined whether or not the operation is to be executed at the second pressing step.

Next, one is set to a variable n (step S2) and the n-th LED is lit-on (step S3). Since n is set to 1, the first LED 6*a* is lit-on. The illumination light using the first LED 6*a* is irradiated to the subject via the projecting port 5*a* of the casing 5. In this case, since the abutting portion 4 is softly abutted to the subject surface so as to prevent the flow-in of the ambient light, the only the illumination light from the first LED 6*a* is projected to the subject. The reflecting light from the subject is formed onto the CCD 8 by using the image pick-up optical system 7.

After starting the light-on operation of the first LED 6*a*, the image pick-up operation of the CCD 8, specifically, the storaging of charges starts (refer to FIG. 5) (step S4).

After ending the image pick-up operation using the CCD 8, then, the first LED 6*a* is lit-off (step S5). The image data is read from the CCD 8, is converted into digital data by the A/D converter 9, and is stored in a predetermined storage area (n-th memory, here, first memory) in the memory 11 (step S6). When the 6-band spectroscopic images are picked-up, the memory 11 has the storage areas serving as the first to sixth memories, and the spectroscopic images are sequentially stored in the storage areas.

Then, the variable n is incremented (step S7). Herein, the variable n is incremented from one to two.

It is determined whether or not the variable n is seven or more (step S8). Since the variable n is 2 yet here, the processing returns to step S3 whereupon the second LED 6b is lit-on. After that, the operation in steps S3 to S7 is performed.

After the sixth LED 6f is lit-on when the variable n is 6 and the operation to step S6 ends, the 6-band spectroscopic image is captured as shown in FIG. 6 and is stored in the memory 11. In step S7, the variable n is incremented to 7, then, in step S8, it is determined that the variable n reaches 7 and the operation for capturing the 6-band spectroscopic images ends.

Figure 7:
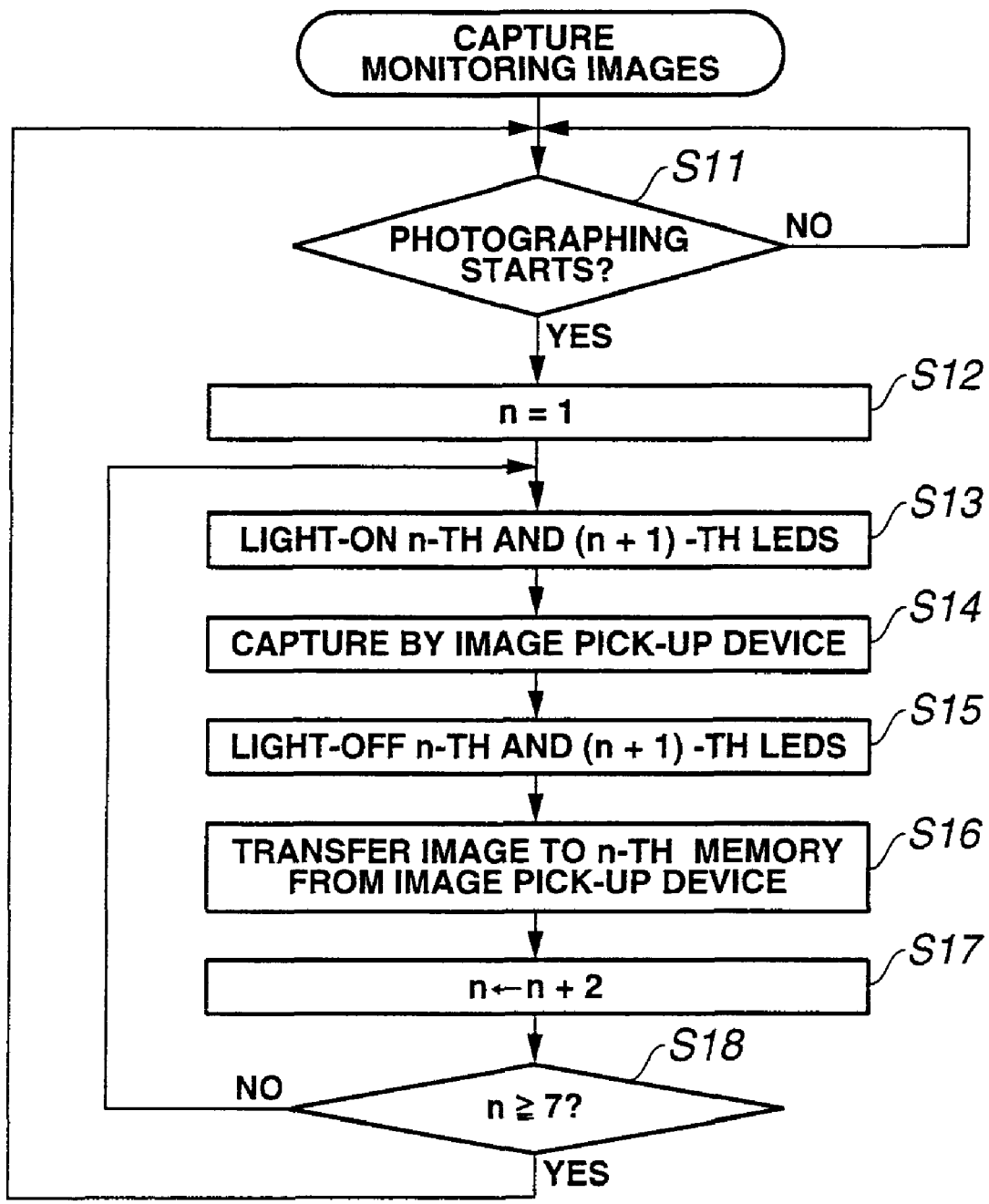
FIG. 7 is a flowchart showing the operations of the light emission of the LEDs and the image capturing by the image pick-up device according to the first embodiment.
Figure 8:
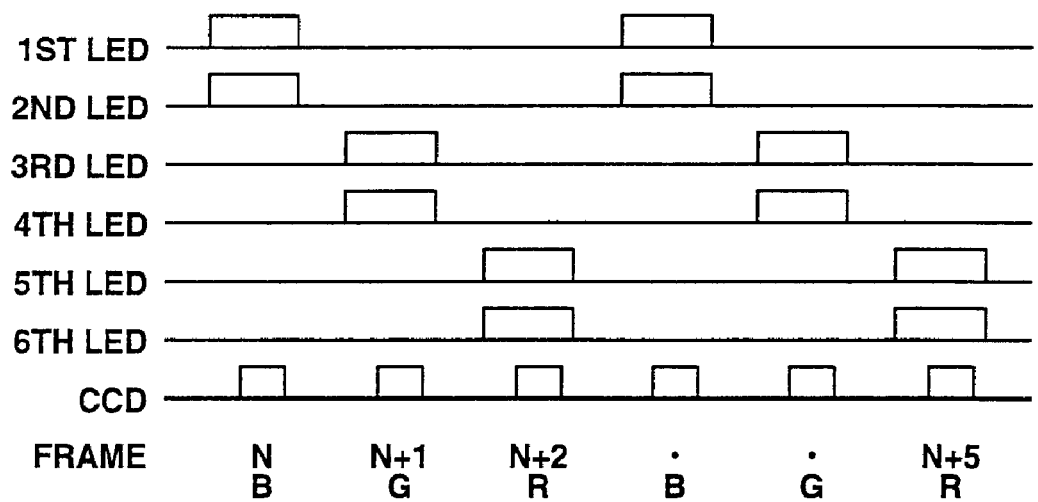
FIG. 8 is a timing chart showing a state of the operations of the light emission of the LEDs and the image capturing by the image pick-up device upon capturing a monitoring image according to the first embodiment.
Figure 9:
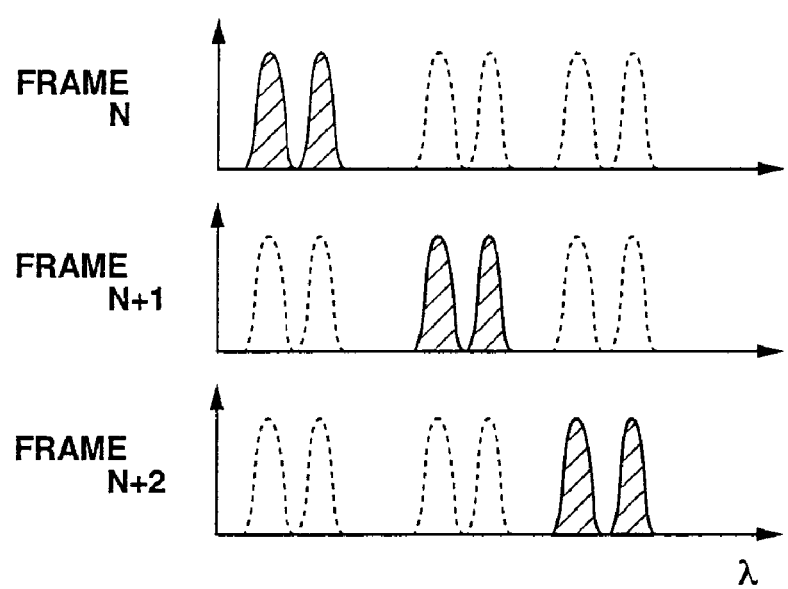
FIG. 9 is a graph showing band characteristics of the frames upon capturing the monitoring image according to the first embodiment.

Although not shown, the image capturing timings by the LEDs and the CCD are not limited to the foregoing. Identically, the LEDs are lit-on after starting capturing the image by the image pick-up device and the image capturing by the image pick-up device ends after the LEDs are lit-off Next, a description is given of the operation in the capturing mode of the monitoring image in the image processing system with reference to FIGS. 7 to 9. FIG. 7 is a flowchart showing the operation for light emission of the LEDs and for image capturing by the image pick-up device upon capturing the monitoring image. FIG. 8 is a timing showing a state of the operation for light emission of the LEDs and for image capturing by the image pick-up device upon capturing the monitoring image. FIG. 9 is a graph showing the band characteristics of the frames upon capturing the monitoring image.

In the capturing mode of the monitoring image, in the illuminating light of the six primary colors from the first to sixth LEDs 6a to 6f, the first LED 6a and the second LED 6b emit the light corresponding to the range of blue (B), the third LED 6c and the fourth LED 6d emit the light corresponding to the range of green (G), and the fifth LED 6e and the sixth LED 6f emit the light corresponding to the range of red (R), thereby capturing the RGB images serving as the moving image by the surface sequential method.

Herein, the primary colors of the light emission are selected for using on general RGB images. However, the present invention is not limited to this and another primary color of the light emission may be selected for using on specific application.

The capturing mode of the monitoring image is set by switching-on the power switch or the mode is returned to the capturing mode of the monitoring image by ending the capturing mode of the spectroscopic image. Then, the start of the image pick-up operation of the monitoring image is waited (step S11).

Herein, the image pick-up operation promptly starts and the variable n is set to one (step S12). The n-th LED and the (n+1)-th LED are lit-on (step S13). Since the variable n is set to one, the first LED 6a and the second LED 6b are lit-on.

After starting the light-on operation of the first LED 6a and the second LED 6b, the image pick-up operation by the CCD 8 starts (refer to FIG. 8) (step S14).

After ending the image pick-up operation by the CCD 8, the first LED 6a and the second LED 6b are lit-off (step S15). The image data is read from the CCD 8, is converted into the digital data by the A/D converter 9, and is stored in a predetermined storage area (n-th memory, here, first memory) in the memory 11 via the bus 10 (step S16).

Then, the variable n is increased by two (step S17). The variable n is increased from 1 to 3.

It is determined whether or not the variable n is 7 or more (step S18). Here, since the variable n is 3 yet, the processing returns to step S13 whereupon the third LED 6c and the fourth LED 6d are lit-on. The operation in steps S13 to S17 is performed.

Thus, the variable n is 5 and further the processing returns to step S13 whereupon the fifth LED 6e and the sixth LED 6f are lit-on. The operation to step S16 ends. The RGB images with the band characteristics shown in FIG. 9 are sequentially captured in order of R, G, and B, and are stored in the first memory, third memory, and fifth memory in the memory 11. The variable n is incremented to 7 in step S17 and therefore it is determined in step S18 that the variable n reaches 7.

After capturing the RGB images, the processing returns to step S11 whereupon it is determined whether or not the next RGB images are captured. When the capturing mode of the monitoring image is sequentially set, the next RGB images are captured. This operation is repeated, thereby capturing the RGB moving images.

Although not shown, the image capturing timings of the LEDs and CCD are not limited to this. Identically, the LEDs are lit-on after starting capturing the image by the image pick-up device and the operation for capturing the image by the image pick-up device ends after lighting-off the LEDs.

The above-mentioned image data stored in the memory 11 is then read, is converted into the image signal for display on the monitor, and is outputted and displayed on the LCD monitor 16 via the monitor I/F 15. Further, the setting of the image processing system is changed, thereby displaying the image data on the display 22 of the processing apparatus 2.

In order to ensure the illuminance, the LEDs for the six primary colors are divided into three groups including the two LEDs, namely, R devices, G devices, and B devices. However, the present invention is not limited to this. For example, the LED for one primary color may be emitted for the light, specifically, the first LED 6a may be emitted with respect to the light B (blue), the third LED 6c may emit the light G (green), and the fifth LED 6e may be emitted with respect to the light R (red). In this case, the LED may be selected such that the spectroscopic characteristics of the LEDs match the RGB light emission.

Only the LED for one primary color or the LEDs for a plurality of primary colors may be lit-on, thereby capturing a monochrome monitoring image. Consequently, the image can be displayed at a high speed on the monitor.

FIG. 10 is a diagram showing an example of lighting-on the LEDs when the three LEDs for each of six primary colors are arranged.

The light-emitting mode includes a case of lighting-on all the LEDs, a case of lighting-on one LED for one primary color, a case of lighting-on the three LEDs for one primary color, a case of lighting-on the LEDs for six primary colors one by one, a case of lighting-on the six LEDs of blue (B) in the eighteen LEDs for six primary colors, a case of lighting-on the six LEDs of green (G) in the eighteen LEDs for six primary colors, a case of lighting-on the six LEDs of red (R) in the eighteen LEDs for six primary colors, a case of lighting-on the three LEDs of blue (B) in the eighteen LEDs for six primary colors, a case of lighting-on the three LEDs of green (G) in the eighteen LEDs for six primary colors, or a case of lighting-on the three LEDs of red (R) in the eighteen LEDs for six primary colors. As mentioned above, the devices for each color simultaneously emit the light and the devices collected at each position simultaneously emit the light.

The photographing apparatus 1 according to the first embodiment picks-up the image of the subject either on contact or on noncontact with the subject. However, in order to accurately reproduce the image, it is necessary to prevent the influence from the light generated by devices other than the photographing apparatus 1.

Therefore, in the case of picking-up the subject image in the noncontact state, the illumination of the exterior lighting needs to be lit-off.

In the case of the subject image which is photographed in the contact state, such as the image of the painting surface, skin surface, or close image, the abutting portion 4 that is cylindrically shaped is softly abutted to the subject (refer to FIG. 1) as mentioned above. The shielding performance is ensured.

Figure 11:
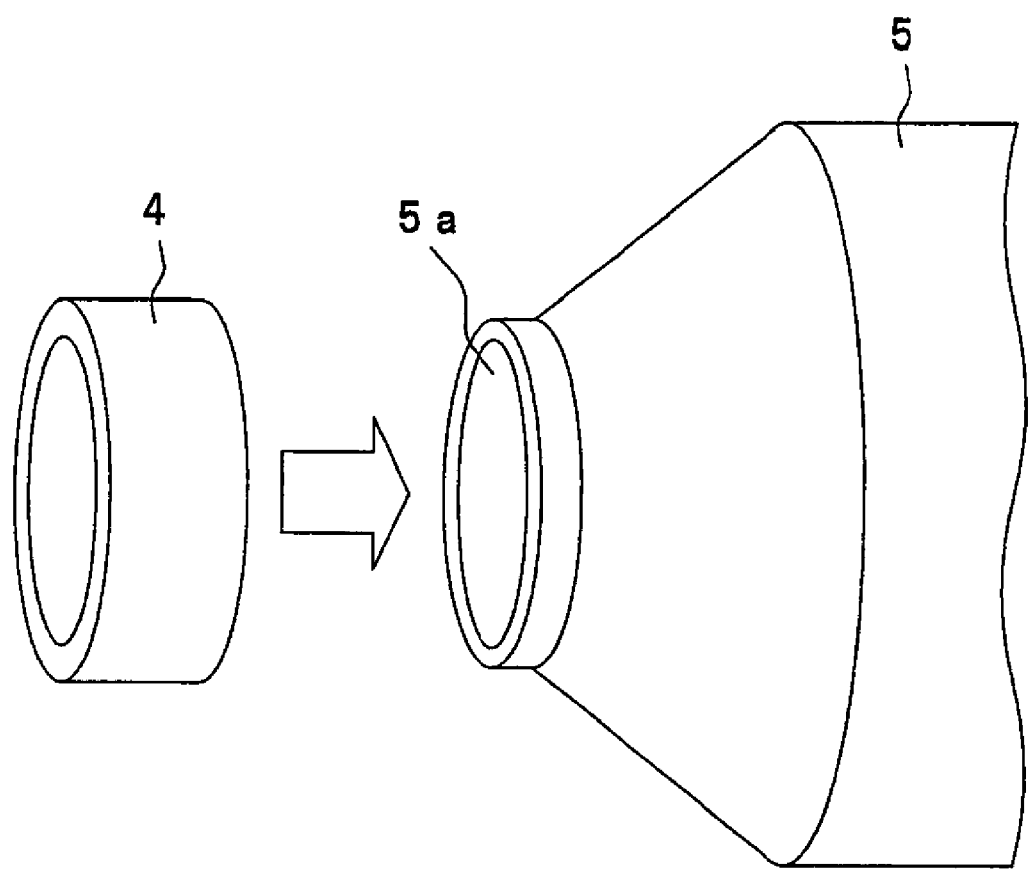
FIG. 11 is a perspective view showing an abutting portion which is detachable to a projecting portion of a casing according to the first embodiment.

Since the abutting portion 4 is used in the image pick-up operation in the contact state, referring to FIG. 11, the abutting portion 4 is detachable and disposable member in view of the sanitation for preventing the bacterial contamination or dirt when the subject is the human body and in view of preventing the transfer of dirt when the subject is a painting plate. FIG. 11 is a perspective view showing the abutting portion 4 that is detachable to the projecting port 5a of the casing 5.

The abutting portion 4 contains a heat insulator when the subject is at the high temperature or low temperature, an electric insulator when the subject is electrostatic or conductive, a solution-proof material when the subject is dipped in the solution, or a glass window for projecting the illuminating light and receiving the reflecting light. Since the abutting portion 4 is a single detachable part, the abutting portion 4 is easily formed, including the various above-mentioned materials. Further, an observing window that is opened and is closed to the abutting portion 4 is easily arranged to observe the subject surface by the naked eyes.

According to the first embodiment, one specific primary color or a plurality of primary colors are used from among the plurality of primary colors whose light is emitted by the LEDs, thereby enabling the use for the examination or determination for specific application.

A description is given of the color reproduction in the processing apparatus 2.

The subject spectroscopic image is recorded to the memory 11 by the image pick-up operation of the photographing apparatus 1, is sent to the processing apparatus 2 via the external I/F 17, and is recorded to an image memory unit 32 (refer to FIG. 12) incorporated in the processing apparatus 2. Then, the calculating device 21 that is operated by predetermined software performs the color reproduction or image processing of the recorded image. The processing result is displayed on the display 22 of the processing apparatus 2 or is transferred and is displayed on the LCD monitor 16.

Figure 12:
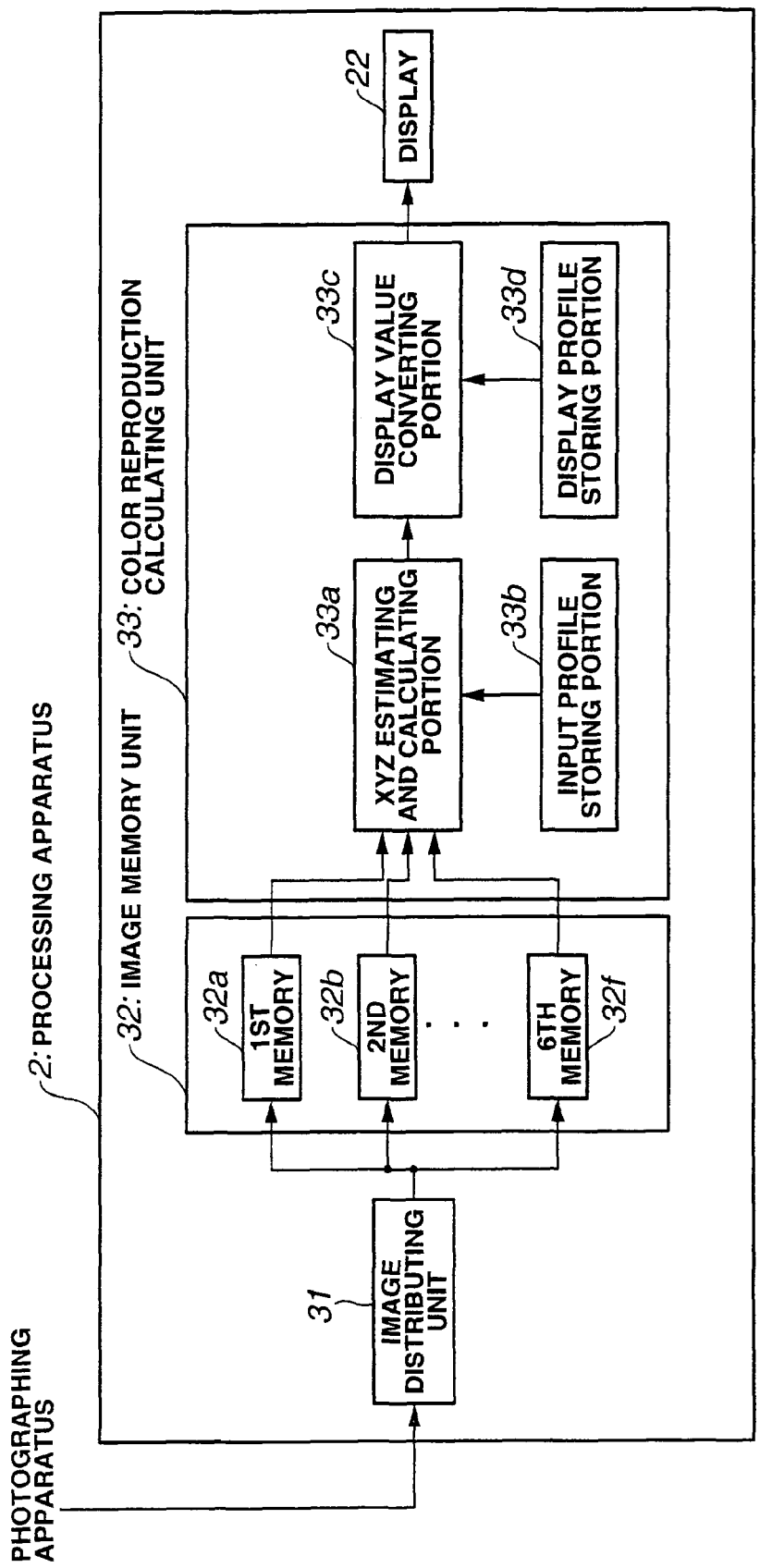
FIG. 12 is a block diagram showing the configuration of the color reproduction for displaying on a display in a processing apparatus according to the first embodiment.

FIG. 12 is a block diagram showing the configuration for performing color reproduction to display on the display 22 in the processing apparatus 2.

The processing apparatus 2 comprises: an image distributing unit 31 which distributes the storage areas in the image memory unit 32 depending on which of the first to sixth LEDs 6a to 6f illuminates the subject spectroscopic images inputted from the photographing apparatus 1; the image memory unit 32 having first to sixth memories 32a to 32f serving as the storage memories for storing the subject spectroscopic images distributed by the image distributing unit 31; and a color reproduction calculating unit 33 which reads the subject spectroscopic image stored in the image memory unit 32 and calculates and outputs display image data for displaying the image that is color-reproduced at the high fidelity level on the display 22. The components 31 to 33 are included in the calculating device 21 shown in FIG. 1. Further, the processing apparatus 2 comprises the display 22 which displays the image that is color-reproduced at the high fidelity level based on the display image data outputted from the color reproduction calculating unit 33.

The color reproduction calculating unit 33 comprises: an input profile storing portion 33b which stores a profile on the photographing apparatus 1; an XYZ estimating and calculating portion 33a which reads the subject spectroscopic images stored in the first to sixth memories 32a to 32f in the image memory unit 32 and creates the image data having three XYZ excitation values by the estimation and calculation using the input profile stored in the input profile storing portion 33b and a predetermined equal-color function set therein; a display profile storing portion 33d which stores a profile on the display 22; and a display value converting portion 33c which creates the display image data for being outputted on the display 22 by the calculation using the image data of the three XYZ excitation values estimated by the XYZ estimating and calculating portion 33a and the display profile stored in the display profile storing portion 33d.

The input profile stored in the input profile storing portion 33b is as disclosed in, e.g., Japanese Unexamined Patent Application Publication No. 2000-341499. The input profile is calculated based on the characteristics and setting of the photographing apparatus 1 including the spectroscopic sensitivity of the CCD 8 used for the image pick-up operation (image input device), spectrum data of the illuminating light upon photographing the subject (information on the illuminating light for photographing), spectrum data of the illuminating light at the installing position of the display 22 for observing the created subject image (information on the illuminating light for observation), information such as static characteristics of the spectroscopic reflectance of the photographed subject (information on the subject characteristics).

Figure 14:
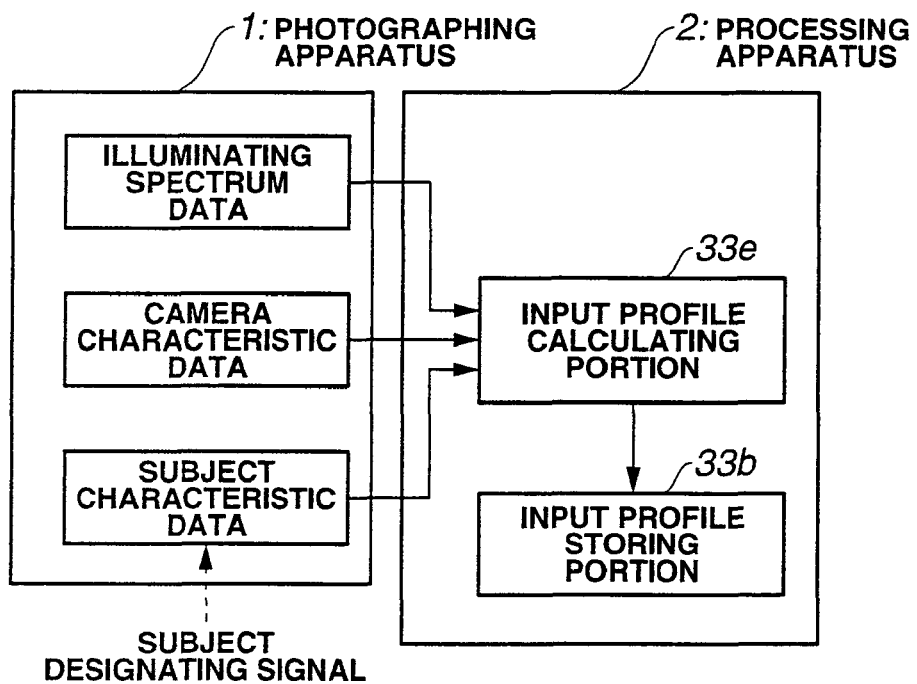
FIG. 14 is a block diagram showing an example configuration for creating an input profile in a processing apparatus according to the first embodiment.

FIG. 14 is a block diagram showing an example configuration for creating the input file in the processing apparatus 2.

Referring to FIG. 14, the input profile may be created based on the data obtained from the photographing apparatus 1 in the processing apparatus 2.

The data obtained by the photographing apparatus 1 includes illumination light spectrum data, camera characteristic data, subject characteristic data, and the like.

The illumination spectrum data is spectrum data on the illumination upon picking-up the image of the subject, for example, and becomes spectrum data of the first to sixth LEDs 6a to 6f included in the photographing apparatus 1 in the contact state. In the non-contact state, the illumination spectrum data includes spectrum data of the external illumination upon photographing the subject.

The camera characteristic data includes characteristics of the image pick-up optical system 7 including a focusing level, image pick-up characteristics of the CCD 8, shutter speed, stop value, and various characteristics.

The subject characteristics include spectroscopic statistic data and the like when the subject is the tooth, skin, or painting material, for example. The operating switch 14 may include in this case a subject designation operating portion to create the input profile with high precision and thus a subject designating signal for designating the subject may be inputted.

Referring to FIG. 14, the processing apparatus 2 which creates the input profile based on the data comprises: an input profile calculating portion 33e which reads the illumination spectrum data, the camera characteristic data, and the subject characteristic data and thus creates the input profile; and the input profile storing portion 33b which stores the input profile created by the input profile calculating portion 33e.

With the above-mentioned configuration, the color can be adaptively reproduced at the high fidelity level even when the photographing apparatus 1 connected to the processing apparatus is changed to the different individual one or different type of device (e.g., the image pick-up optical system 7 is changed) and even when the environment illumination for photographing is changed or the subject serving as the photographing target is variously changed.

The display profile stored in the display profile storing portion 33d is calculated, based on information such as a chromaticity value of a display primary-color value of the display 22 (e.g., RGB primary color values when the display 22 is an RGB monitor) and the tone curve of the display 22. The display may be a multi-primary-color reproducing system disclosed in Japanese Unexamined Patent Application Publication No. 2000-338950.

Figure 13:
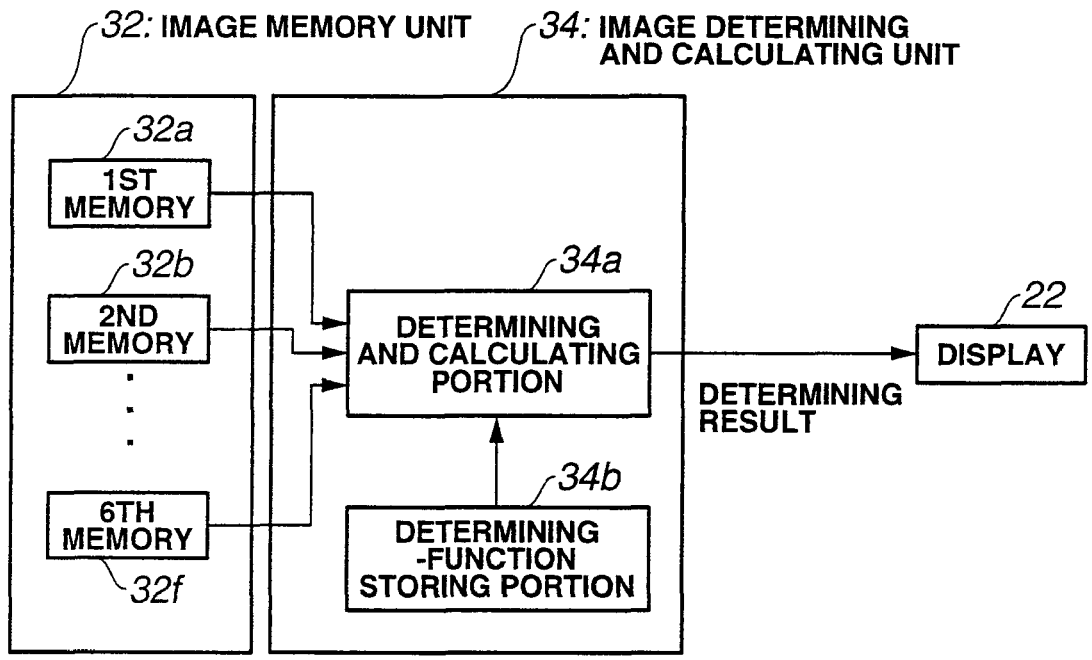
FIG. 13 is a block diagram showing an example configuration for determining an image of a subject based on the captured subject spectroscopic image according to the first embodiment.

FIG. 13 is a block diagram showing an example configuration for image determination of the subject based on the captured subject spectroscopic image.

The subject spectroscopic image stored in the first to sixth LEDs 32a to 32f in the image memory unit 32 is read and is determined on the subject image by an image determining and calculating unit 34. The determining result is outputted and is displayed on the display 22. The image may be determined and may be calculated via a network and the result may be displayed on the LCD monitor 16.

The image determining and calculating unit 34 comprises: a determining function storing portion 34b which stores a determining function for various classification/determination/diagnosis/analysis on the subject; and a determining and calculating portion 34a which calculates, by using the determining function, all the six subject spectroscopic images stored in the first to sixth memories 32a to 32f in the image memory unit 32 or at least one subject spectroscopic image selected from the six ones, thus brings out the determining result, and creates image data for displaying the determining result on the display 22.

The determining function can be variously replaced depending on for which application the image processing system is used. If the image processing system is limited to the use for dentistry, the determining function is replaced with the determination of tooth whitening level and the determination of tooth tone. If the image processing system is limited to the use for dermatology, the determining function is replaced with the correlation and the entropy analysis between the crista cutis and the sulcus cutis on the skin surface. Therefore, the determining function storing portion 34b may comprise a rewritable or write-once storage medium which can rewrite and add the determining function used depending on the application. An example of the above-mentioned determining function is a function disclosed in Japanese Unexamined Patent Application Publication No. 7-120324.

The image determining and calculating unit 34 shown in FIG. 13 may be provided in the processing apparatus 2, in place of the color-reproduction calculating unit 33 shown in FIG. 12. Alternatively, the image determining and calculating unit 34 shown in FIG. 13 and the color-reproduction calculating unit 33 shown in FIG. 12 may be provided in the processing apparatus 2 and thus the processing may be simultaneously executed or may be performed by selectively switching the necessary one.

Figure 15:
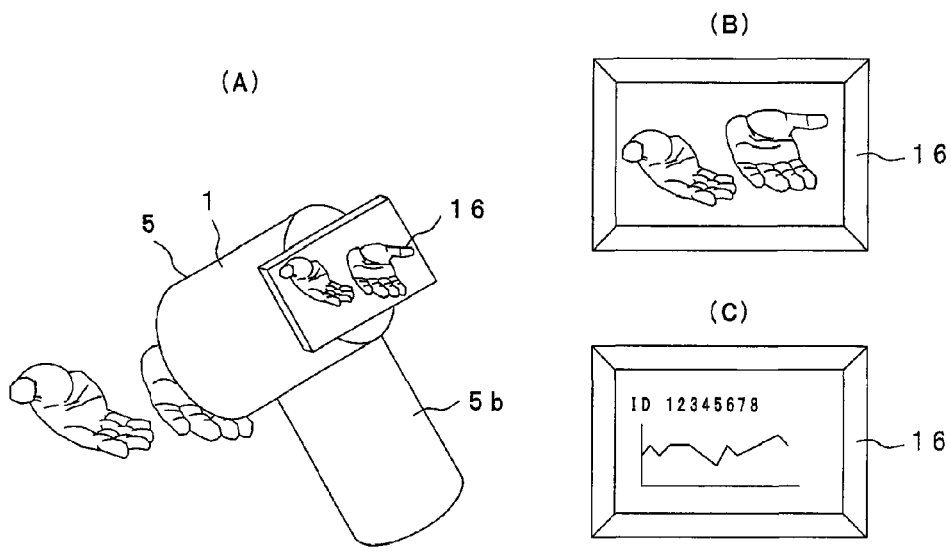
FIG. 15 is a diagram showing a display example on an LCD monitor in a photographing apparatus according to the first embodiment.

Next, FIG. 15 is a diagram showing a display example of the LCD monitor 16 in the photographing apparatus 1.

Referring to FIG. 15(A), the LCD monitor 16 is arranged to the top of a grip portion 5b on the rear side of the casing 5 in the photographing apparatus 1, and displays an image as shown in FIG. 15(B) or 15(C). Herein, an image of the hand is picked-up as an example.

FIG. 15(B) shows a state displaying the moving image picked-up in the capturing mode of the monitoring image. The LCD monitor 16 has a function of a finder.

FIG. 15(C) shows a state for displaying the determining result of the subject image by the image determining and calculating unit 34. The LCD monitor 16 displays an ID number of the subject (e.g., patient number in a diagnostic supporting system in the medical field) and a graph indicating a numerical analysis result obtained by the image determination (e.g., curing process). In addition to the foregoing, the LCD monitor 16 displays various information including a color-reproducing image, patient medical record, various data, and charts.

The LCD monitor 16 has the function of the finder upon selecting the photographed portion and the function of the monitor upon displaying the color-reproduced result and the result of classification/determination/diagnosis/analysis.

In many cases, the display 22 of the processing apparatus 2 has a wider area and higher definition, as compared with those of the LCD monitor 16 arranged to the handy photographing apparatus 1. Therefore, the display 22 may display the activation, condition setting, GUI for inputting information such as subject ID, patient career, subject information such as previous information, and the processing result, of processing software executed depending on the purpose in the processing apparatus 2.

An external database is connected to the network 3, for example. The subject information may be obtained to the processing apparatus 2 from the external database, or the processing result in the processing apparatus 2 may be stored into the external database. In this case, in order to ensure the security, the identification can be mutually performed upon connecting the processing apparatus 2 and the external system via the network 3 or the identification can be performed in accordance with the security level which is added to the subject data.

Figure 16:
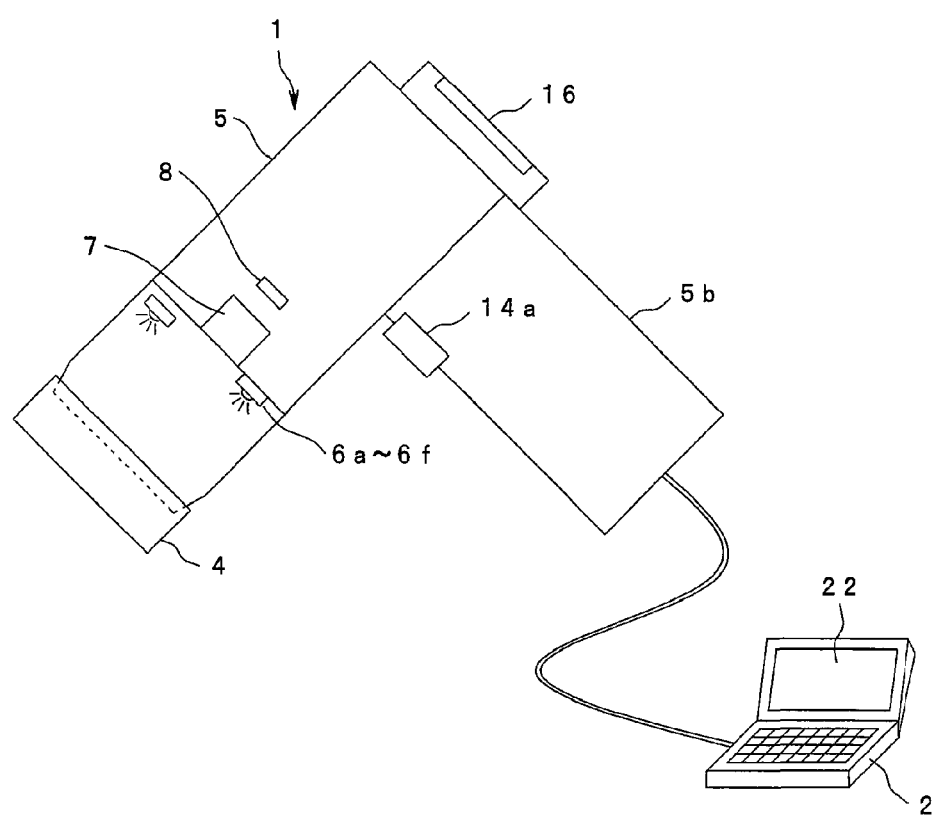
FIG. 16 is a diagram showing an example of a state of using the image processing system according to the first embodiment.

FIG. 16 is a diagram showing a state of using the image processing system.

The photographing apparatus 1 is compact in size and light in weight. For example, the photographing apparatus 1 performs the image pick-up operation by abutting the front end side of the casing 5 having the image pick-up system to a photographing target portion of the subject by gripping the grip portion 5b with one hand.

As mentioned above, the abutting portion 4 is a detachable and disposable member, and shields the external light which irradiates the photographing target portion of the subject.

A photographing button 14a included in the operating switch 14 is arranged on the top of the grip portion 5b, e.g., the position operable with the forefinger. The portion to be photographed is specified on the LCD monitor 16 and then the photographing button 14a is pressed down, thereby shifting the capturing mode of the monitoring image to the capturing mode of the spectroscopic image to perform the image pick-up operation of the spectroscopic image.

The captured spectroscopic images are subjected to data processing in the processing apparatus 2 and is displayed on the display 22. As mentioned above, the processing result of the processing apparatus 2 may be displayed on the LCD monitor 16 in the photographing apparatus 1 by the setting and the like if necessary.

In the example shown in FIG. 16, the processing apparatus 2 is shown as a notebook type personal computer with a display. In this case, the processing apparatus 2 may be connected to the network 3 via an interface (I/F) such as RS-232C, USB, or IEEE1394 provided in the notebook type personal computer.

According to the first embodiment, the photographing apparatus in the image processing system comprises six LEDs having different spectroscopic distributions in the visible light area. The subject spectroscopic image is picked-up by emitting the light of the six LEDs while shading the ambient light. In this case, the photographing apparatus is reduced in size because the compact light semiconductor light-emitting device such as the LED is used as the light source, and the photographing apparatus may be a handy one.

The processing of the processing apparatus enables the display to display the image with the color reproduced at the high fidelity level.

The designation of the LED for emitting the light and the light-emitting sequence of the LEDs enables to pick-up images of not only the normal RGB moving images but also images used for various purposes.

Further, the use of the monochrome CCD slightly reduces the costs. The image data of colors is captured one screen by one screen without causing a lacking of pixel. Therefore, the interpolation is omitted.

Figure 17:
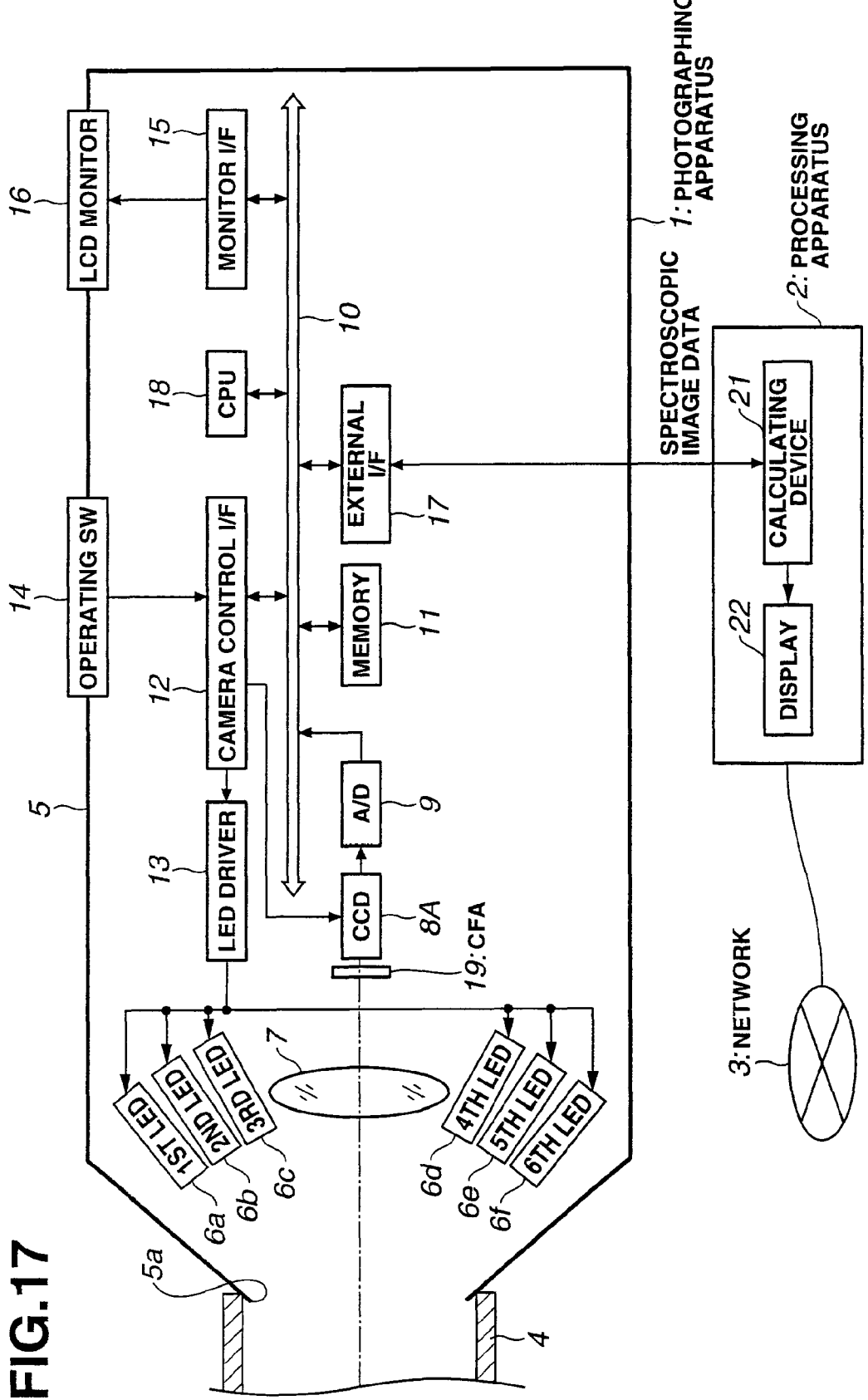
FIG. 17 is a block diagram showing the configuration of an image processing system according to the second embodiment of the present invention.
Figure 19:
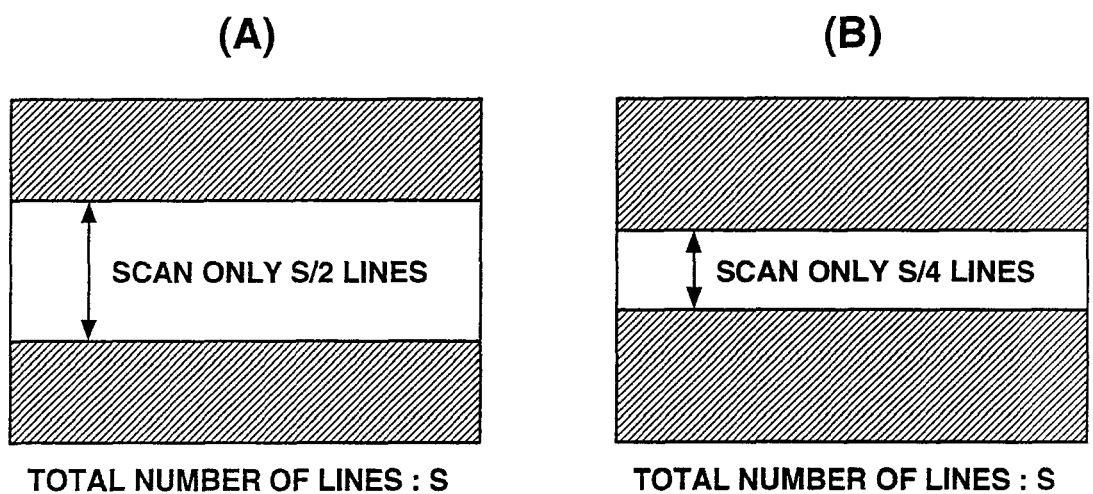
FIG. 19 is a diagram showing a state of lines read in a 2/4-line double-speed mode and a 2/8-line four-time speed mode according to the second embodiment.
Figure 20:
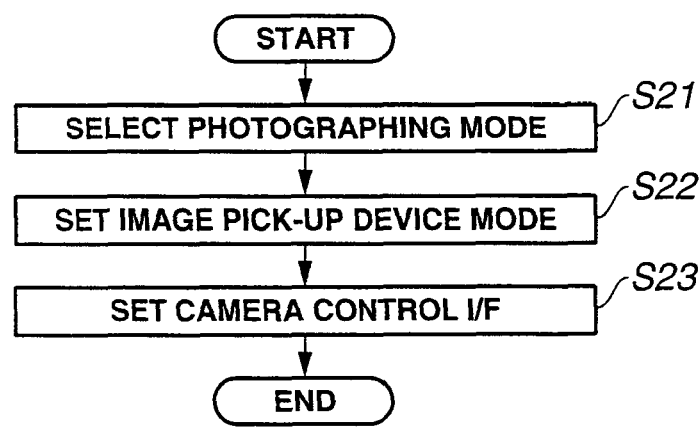
FIG. 20 is a flowchart showing the operation for setting a photographing mode according to the second embodiment.

FIGS. 17 to 20 relate to a second embodiment of the present invention. FIG. 17 is a block diagram showing the configuration of an image processing system. FIG. 18 is a timing chart showing reading states in a full mode and a double-speed mode. FIG. 19 is a diagram showing a state of lines read in a 2/4-line double-speed mode and a 2/8-line four-time speed mode. FIG. 20 is a flowchart showing the operation for setting a photographing mode.

According to the second embodiment, the same components as those according to the first embodiment are designated by the same reference numerals and are not described. Mainly, only different portions are described.

The second embodiment uses the basic configuration according to the first embodiment. Further, according to the second embodiment, it is possible to adjust an image reading speed from a color CCD having a color filter array (CFA) 19 in front of the image processing system.

The image reading speed corresponds to a display speed, and the display speed cannot be faster than the image reading speed.

Generally, in the case of monitoring the image, preferably, the display interval is 30 images/sec or more. As a number N of primary colors increases, the display interval becomes long in proportion to the increase, and a flickering state and the large image positional shift due to difference of time to capture a primary color image are caused.

Therefore, according to the second embodiment, referring to FIG. 17, a camera control I/F 12A adjusts the image reading speed from a CCD 8A so that the long display interval is prevented and the display interval is constant irrespective of the read number N of primary colors.

A description is given of the operation for setting the photographing mode with reference to FIG. 20.

An operation for selecting the photographing mode is inputted from the operating switch 14 (step S21) and the CPU 18 detects the input and then records the set photographing mode and the information thereon to a part of recording area in the memory 11 (step S22). Further, the CPU 18 issues a control command for changing the photographing mode to the camera control I/F 12A (step S23).

The camera control I/F 12A receives the instruction, controls the driving operation of the CCD 8A, and changes the photographing mode. In this case, the camera control I/F 12A controls the LED driver 13 interlockingly to the operation of the CCD 8A, thereby adjusting the amount of light emission of the first to sixth LEDs 6a to 6f together.

The photographing mode set by the photographing apparatus 1 is as follows, for example.
(1) Full mode
(2) Reading double-speed mode
(3) 2/4 line double-speed mode
(4) 2/8 line four-time-speed mode
(5) 2/16 line eight-time-speed mode
(6) First center-portion scanning mode
(7) Second center-portion scanning mode
(8) Third center-portion scanning mode
(9) Fourth center-portion scanning mode
(10) First center-portion high-speed scanning mode
(11) Second center-portion high-speed scanning mode Referring to FIG. 18(A), the "full mode" is a normal mode for sequentially reading all the pixels of all scanning lines of the CCD 8A at the normal speed. Here, the frames include the frame for simultaneously emitting the light of the first LED 6a, the third LED 6c, and the fifth LED 6e, and the frame for simultaneously emitting the light of the second LED 6b, the fourth LED 6d, and the sixth LED 6f. Means for capturing the six-primary-color image by the above-mentioned light emission will be described later according to the third embodiment.

As compared with the normal mode shown in FIG. 18(A), the "reading double-speed mode" is a mode for sequentially reading all the pixels of all the scanning lines of the CCD 8A at the double speed of the normal one as shown in FIG. 18(B). Although the reading speed of the double speed is explained as an example, the present invention is not limited to this and may be a proper-multiple time or a variable multiple time.

The "2/4 line double-speed mode" is a mode for reducing, to the half, the time for reading one frame by scanning only two lines every four lines. Although the resolution in the vertical direction is half, the image in the entire effective area is obtained.

The "2/8 line four-time-speed mode" is a mode for reducing, to ¼ time of the normal mode, the time for reading one frame by scanning only 2 lines every eight lines.

The "2/16 line eight-time-speed mode" is a mode for reducing, to ⅛ time of the normal mode, the time for reading one frame by scanning only 2 lines every 16 lines.

Referring to FIG. 19(A), the "first center-portion scanning mode" is a mode for reducing, to the half, the time for reading one frame by scanning only a portion of an S/2 (here, reference symbol S denotes the number of all the scanning lines) line in the center portion within the effective area.

Referring to FIG. 19(B), the "second center-portion scanning mode" is a mode for reducing, to ¼ speed, the time for reading one frame by scanning only a portion of an S/4 (here, reference symbol S denotes the number of all the scanning lines) line in the center portion within the effective area.

Similarly, the "third center-portion scanning mode" is a mode for reducing, to ⅛ speed, the time for reading one frame by scanning only a portion of the S/8 line in the center within the effective area.

Similarly, the "fourth center-portion scanning mode" is a mode for reducing, to 1/16 speed, the time for reading one frame by scanning only a portion of the S/16 line in the center within the effective area.

Referring to FIG. 19(A), the "first center-portion high-speed scanning mode" is a mode for reducing, to ¼ speed, the time for reading one frame by scanning only a portion of the S/2 line in the center portion within the effective area at the double speed of the normal one.

Referring to FIG. 19(B), the "second center-portion high-speed scanning mode" is a mode for reducing, to ⅛ speed, the time for reading one frame by scanning only a portion of the S/4 line in the center portion within the effective area at the double speed of the normal one.

The present invention is not limited to those and another means can scan the lines at the high speed. The photographing mode is summarized as follows, including the foregoing.

First, simply, the scanning speed is made fast. This is achieved by adjusting the timing of a trigger timing for instructing the reading start. For example, when the display time of one frame is 1/30 sec, the increase in speed is accomplished by setting the timing of the trigger signal so that the reading time of the prima colors (here, N primary colors) is 1/30/N.

Secondly, the scanning speed is made fast by thinning-out operation. The above first speed increasing means causes the limitation on the fast speed due to the image pick-up device. On the contrary, in the case of thinning out the lines, although the image quality is deteriorated, the speed can be made increased by stable scanning operation. Therefore, the degradation of a frame rate is prevented and the flickering state on the display is prevented. As the thinning-out example, the lines are thinned-out based on a pixel unit in addition to the thinning-out operation for a predetermined period or a predetermined range based on a line unit. When the image pick-up device is an XY address type one, only a desired pixel is precisely read.

Thirdly, the speed is made increased by varying the frame rate depending on the primary color. In CCDs including a standard RGB color filter or the like, in many cases, the green (G) pixels close to a luminance signal are arranged double number of red (R) or blue (B) pixels. In consideration thereof, it is possible to read the frame having the pixels close to the green (G) ones in the six primary colors, corresponding to the double number of frames of the color other than the green, i.e., the red and blue. The present invention is not limited to this and many frames of the specific primary color may be read or a reading rate may be varied step by step in accordance with the necessity.

According to the second embodiment, the same advantages as those according to the first embodiment are obtained. Further, the constant display speed is ensured by changing the reading speed. In the case of the color reproduction at the high fidelity level, the moving image with natural motion is displayed.

Figure 21:
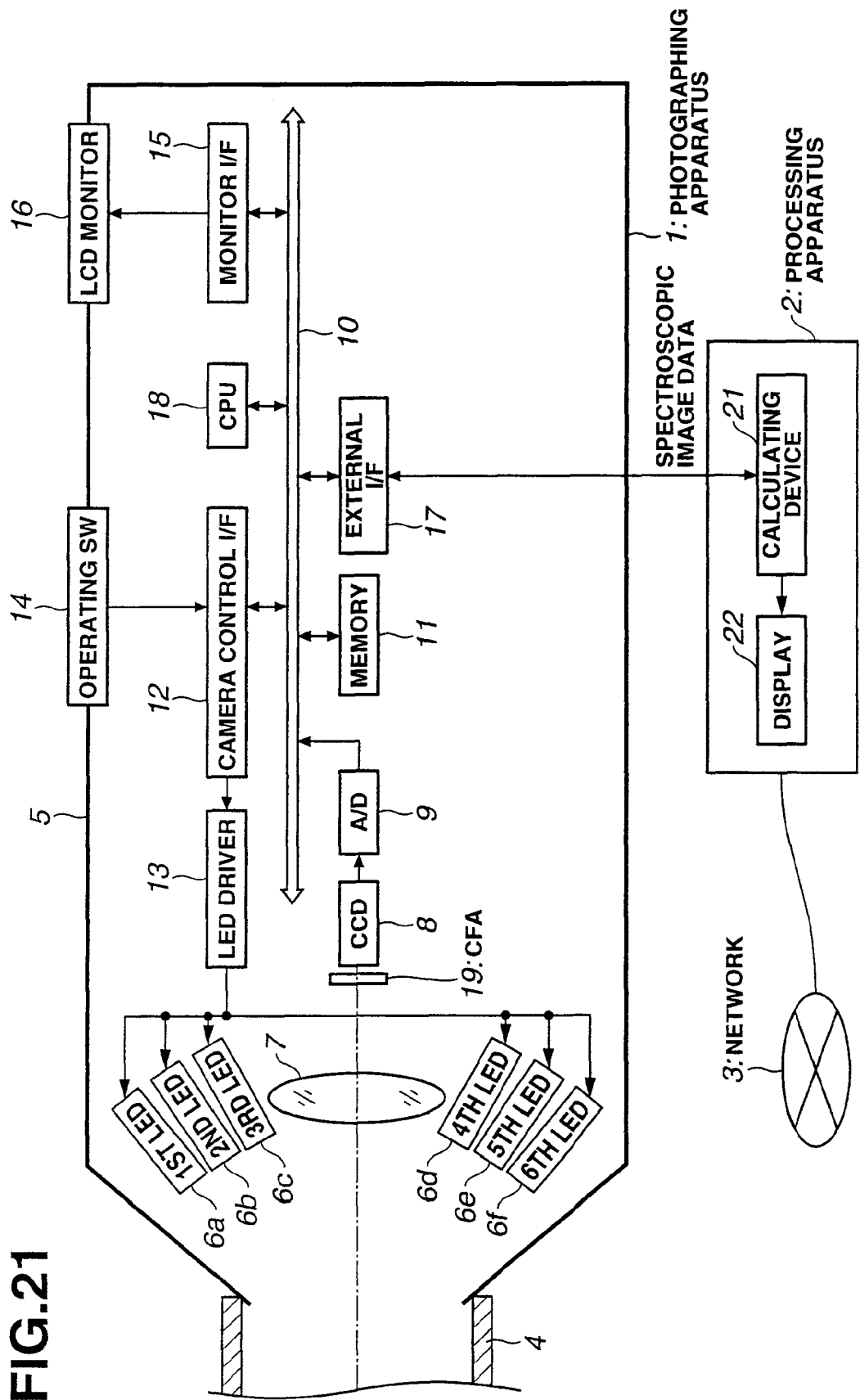
FIG. 21 is a block diagram showing the configuration of an image processing system according to the third embodiment of the present invention.
Figure 22:
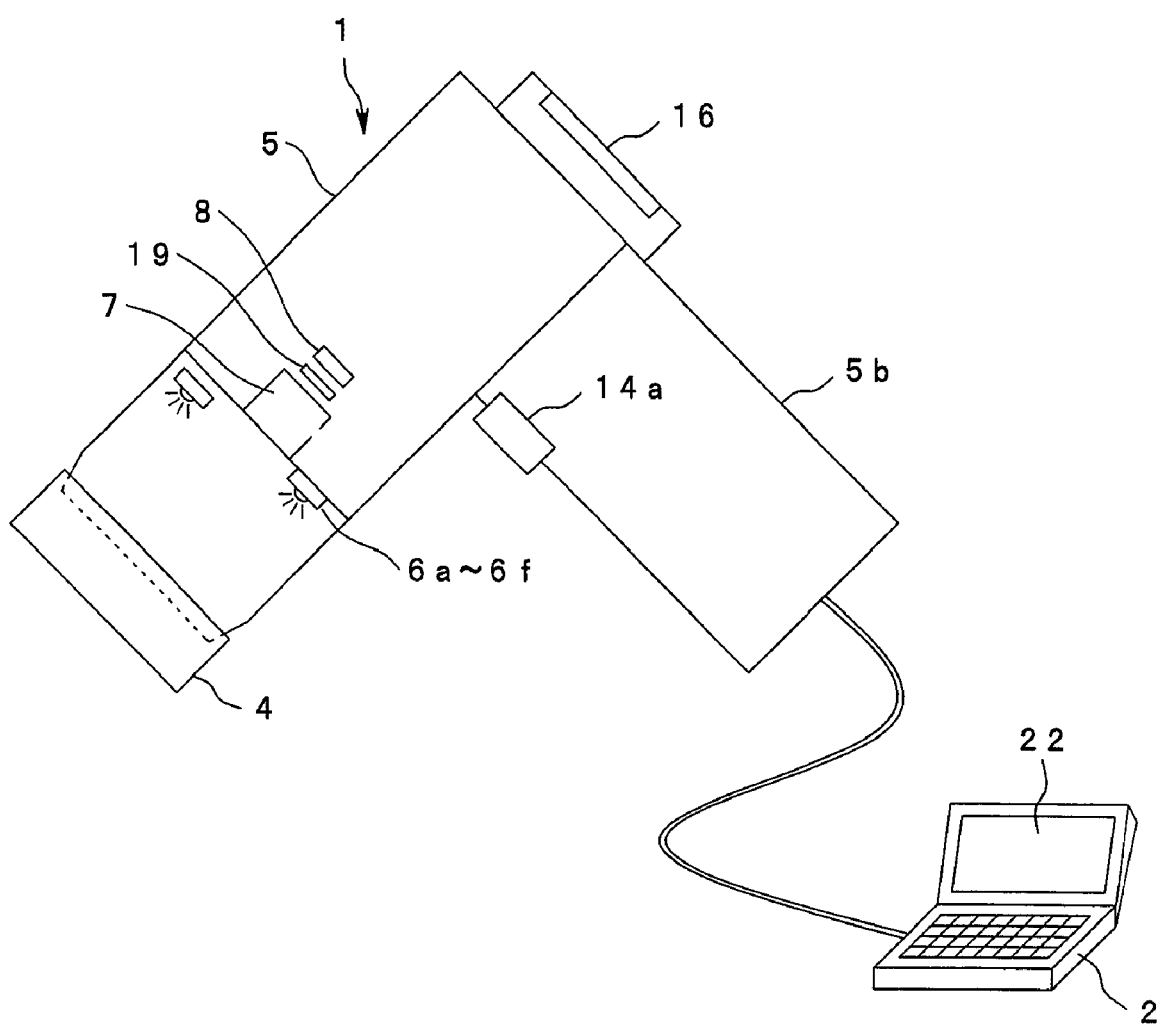
FIG. 22 is a diagram showing an example of a state of using the image processing system according to the third embodiment.

FIGS. 21 to 36 relate to the third embodiment of the present invention. FIG. 21 is a block diagram showing the configuration of an image processing system. FIG. 22 is a diagram showing an example of a state of using the image processing system. According to the third embodiment, the same components as those according to the first embodiment are designated by the same reference numerals and are not described. Mainly, only different portions are described.

The third embodiment uses the basic configuration according to the first embodiment. Further, according to the third embodiment, a 3-band color filter array is arranged onto the image pick-up surface of the CCD.

Referring to FIGS. 21 and 22, the photographing apparatus 1 comprises a 3-band (RGB) color filter array 19 (abbreviated to a CFA in the drawings) near the CCD 8 on the optical path on which the image pick-up optical system 7 forms the subject image, and a single-plate color image pick-up device is provided as the image pick-up device.

FIG. 23 is a graph showing the light-emitting spectrums of the first to sixth LEDs 6a to 6f and the spectroscopic sensitivity characteristics of the CCD 8, the spectroscopic sensitivity characteristics passing through the color filter array 19.

With respect to the light-emitting spectrums of the 6-primary-color LEDs shown by the curves fL1 to fL6 as shown according to the first embodiment, curves fSB, fSG, and fSR shown in FIG. 23 denote the total spectroscopic sensitivity characteristics which are obtained by the transmittance distribution of the color filter array 19 and the light-receiving sensitivity distribution of the CCD 8.

Among the curves fSB, fSG, and fSR, the curve fSB indicating a spectroscopic band area corresponding to a blue color filter includes the two curves fL1 and fL2, and receives the light emitted by the first LED 6a and the second LED 6b. The curve fSG indicating a spectroscopic band area corresponding to a green color filter includes the two curves fL3 and fL4, and receives the third LED 6c and the fourth LED 6d. The curve fSR indicating a spectroscopic band area corresponding to a red color filter includes the two curves fL5 and fL6, and receives the fifth LED 6e and the sixth LED 6f.

The total spectroscopic sensitivity characteristics are not necessarily independently separated and may be partly overlaid at the peripheral portion. Further, similarly to the first embodiment, the light-emitting spectrums of the first to sixth LEDs 6a to 6f may be partly overlaid. Of course, the number of LED types is not limited to six and a proper number of LEDs may be combined.

Next, the operation for capturing the image will be described.

Similarly to the first embodiment, in the image processing system the capturing mode of the monitoring image and the capturing mode of the spectroscopic image are switched to capture the image.

Figure 26:
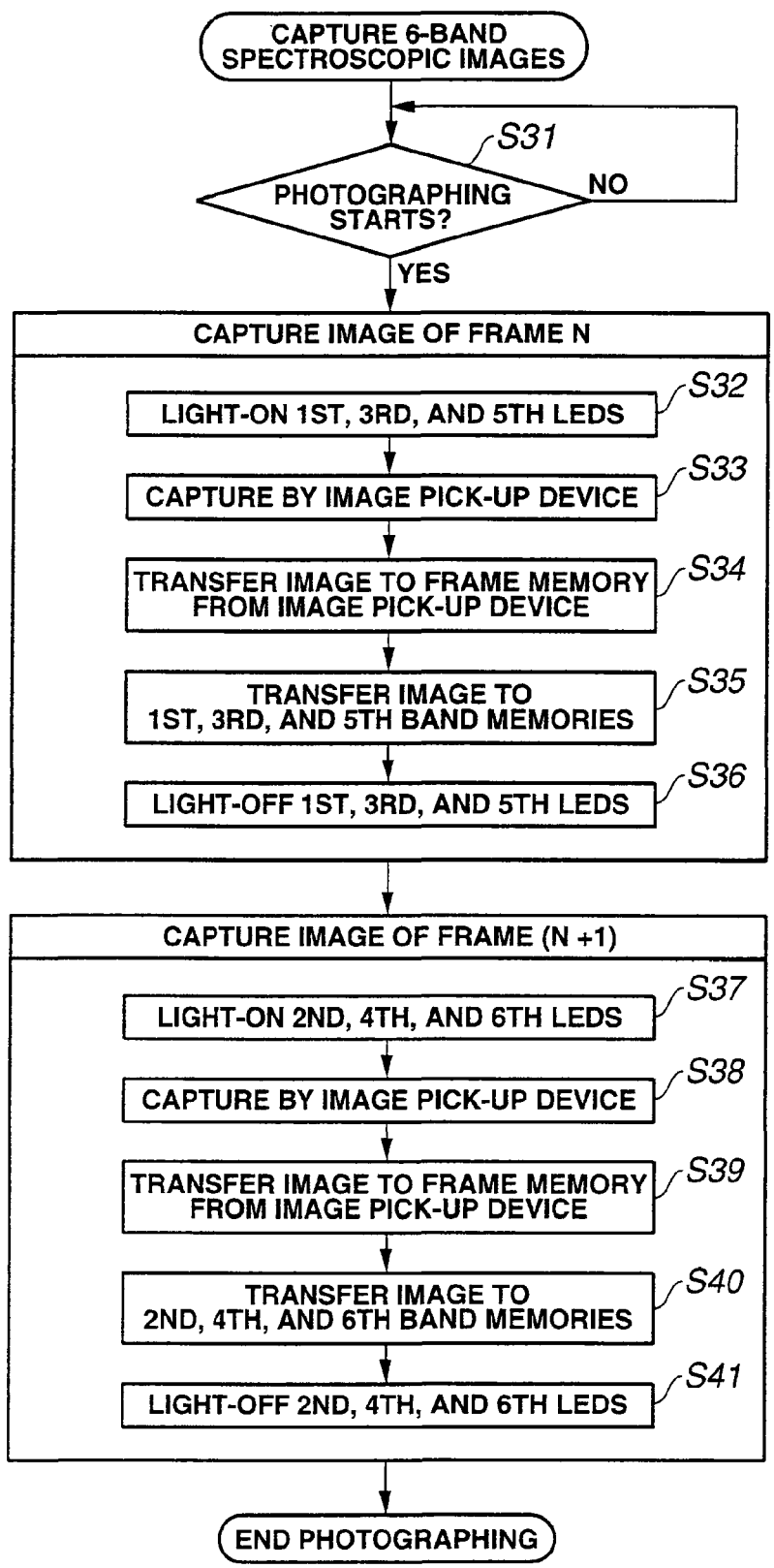
FIG. 26 is a flowchart showing the operations for light emission of LEDs and for image capturing by an image pick-up device, upon capturing the 6-band spectroscopic images according to the third embodiment.
Figure 27:
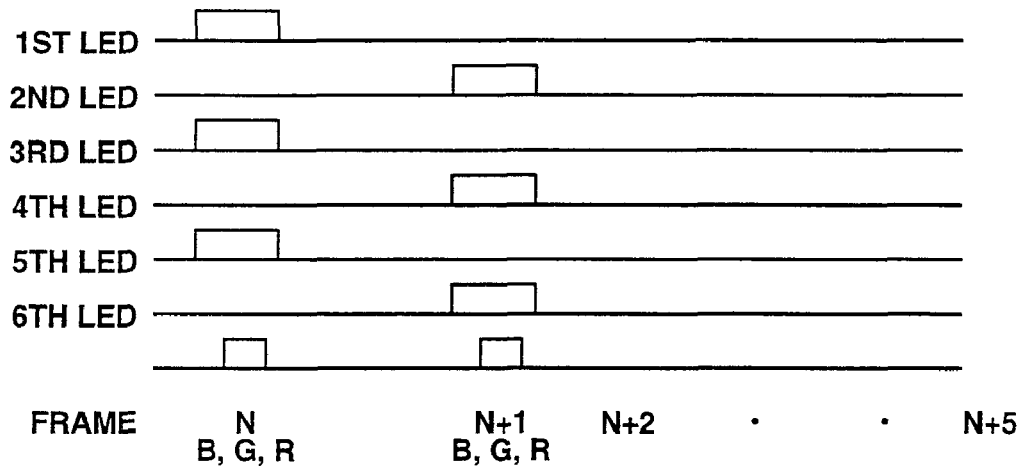
FIG. 27 is a timing chart showing states of the operations for light emission of the LEDs and for image capturing by the image pick-up device upon capturing the 6-band spectroscopic images according to the third embodiment.

The operation of the capturing mode of the spectroscopic image will be described with reference to FIGS. 24, 26, and 27. FIG. 24 is a graph showing the spectroscopic characteristics of the spectroscopic images of frames upon creating the 6-band spectroscopic images. FIG. 26 is a flowchart showing the operations for light emission of LEDs upon capturing the 6-band spectroscopic images and for image capturing by an image pick-up device. FIG. 27 is a timing chart showing states of the operations for light emission of the LEDs upon capturing the 6-band spectroscopic images and for image capturing by the image pick-up device.

As mentioned above according to the first embodiment, the photographing button 14a is pressed, thereby switching the mode to the capturing mode of the spectroscopic image. Then, it is determined whether or not the image pick-up operation of the spectroscopic image starts (step S31).

The image pick-up operation of the spectroscopic image starts, then, the image of the frame N is captured, and the image of a frame (N+1) is thereafter captured.

The capturing operation of the image of the frame N starts and then the first LED 6a, the third LED 6c, and the fifth LED 6e are simultaneously lit-on (refer to FIG. 24(A)) (step S32). After the light-on operation, the CCD 8 starts to pick-up the image (refer to FIG. 27) (step S33).

After the image pick-up operation of the CCD 8 ends, the image data is read from the CCD 8, is converted into the digital data by the A/D converter 9, and is stored in a predetermined storage area (frame memory) in the memory 11 via the bus 10 (step S34).

The image data stored in the frame memory is classified every primary color, and is stored in the predetermined storage area (first, third, and fifth memories) in the memory 11 (step S35).

Then, the first LED 6a, third LED 6c, and fifth LED 6e are lit-off (step S36) and thus the capturing operation of the images of the frame N ends.

The capturing operation of the image of the next frame (N+1) is basically similar to the capturing operation of the image of the frame N, only different in the lit-on LED and the memory area in which the picked-up image data is transferred.

That is, the second LED 6b, the fourth LED 6d, and the sixth LED 6f are simultaneously lit-on (refer to FIG. 24(B)) (step 37). After starting the light-on operation, the image pick-up operation of the CCD 8 starts (refer to FIG. 27) (step S38).

After the image pick-up operation of the CCD 8 ends, the image data is read from the CCD 8, is converted into the digital data by the A/D converter 9, and is stored in a predetermined storage area (frame memory) in the memory 11 via the bus 10 (step S39).

The image data stored in the frame memory is classified every primary color, and is stored in the predetermined storage area (second, fourth, and sixth memories) in the memory 11 (step S40).

Then, the second LED 6b, fourth LED 6d, and sixth LED 6f are lit-off (step S41) and thus the capturing operation of the images of the frame (N+1) ends.

Although not shown, the image capturing timing of the LEDs and the CCD is not limited to this and, identically, the LEDs may be lit-on after starting capturing the image by the image pick-up device and the operation for capturing the image by the image pick-up device may end after the light-off operation of the LED.

The images of the primary colors stored in the first to sixth memories in steps S35 to S40 are subjected to the interpolation in the photographing apparatus 1 or the processing apparatus 2 if necessary because of the lack of a pixel in accordance with the alignment of the primary colors in the color filter array 19.

The 6-band subject spectroscopic images stored in the memory 11 are sent to the processing apparatus 2 and are subjected to the color reproduction and image processing by a processing program. The processing result is displayed on the display 22 by another processing program or is transferred to the photographing apparatus 1 and is displayed on the LCD monitor 16.

Figure 28:
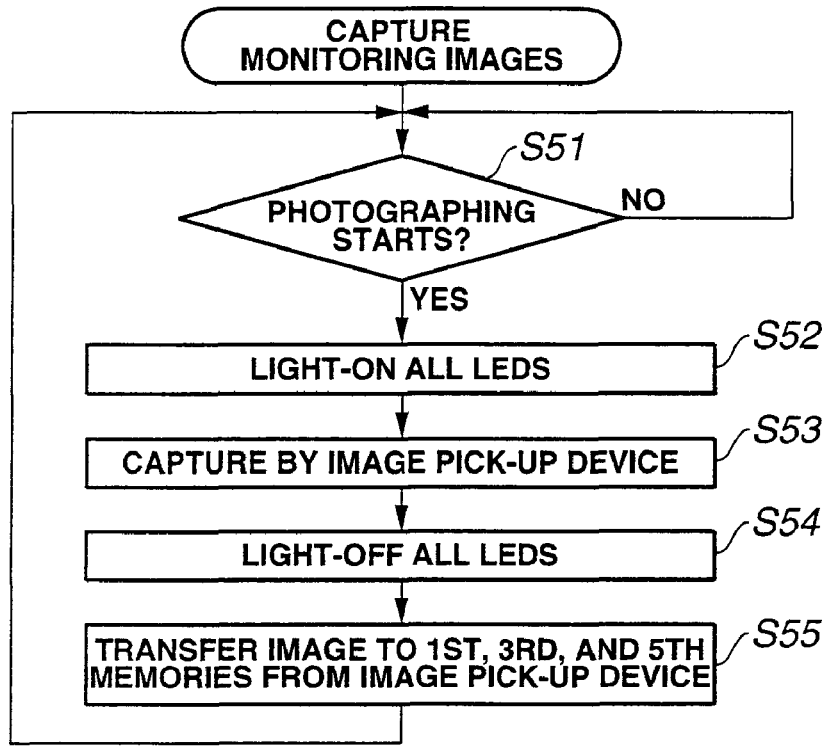
FIG. 28 is a flowchart showing the operations for light emission of the LEDs and for image capturing by the image pick-up device, upon capturing the monitoring image according to the third embodiment.
Figure 29:
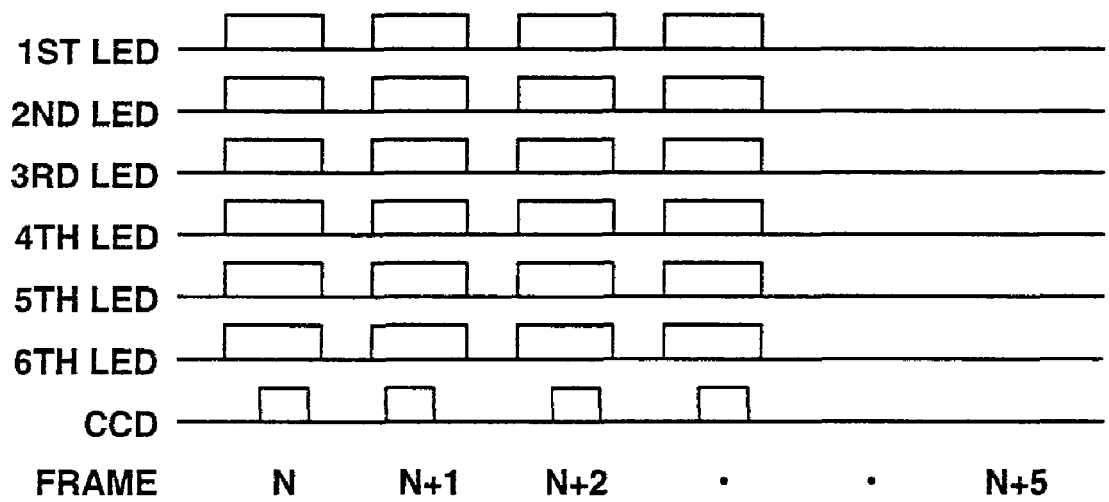
FIG. 29 is a timing chart showing states of the operations for light emission of the LEDs and for image capturing of the image pick-up device, upon capturing the monitoring image according to the third embodiment.

Next, a description is given of the operation of the capturing mode of the monitoring image with reference to FIGS. 25, 28, and 29. FIG. 25 is a graph showing the spectroscopic characteristics of the frames upon creating the monitoring image. FIG. 28 is a flowchart showing the operations for light emission of the LEDs upon capturing the monitoring image and for image capturing by the image pick-up device. FIG. 29 is a timing chart showing states of the operations or light emission of the LEDs upon capturing the monitoring image and for image capturing by the image pick-up device.

Similarly to the first and second embodiments, according to the third embodiment, the general RGB images are assumed and the primary colors for light emission are selected so that the first LED 6a and the second LED 6b correspond to the blue (B), the third LED 6c and the fourth LED 6d correspond to the green (G), and the fifth LED 6e and the sixth LED 6f correspond to the red (R).

The power switch is turned on, thereby setting the capturing mode of the monitoring image. Alternatively, the capturing mode of the spectroscopic image ends, thereby returning the mode to the capturing mode of the monitoring image. Thus, the start for picking-up the monitoring image is waited (step S51).

Promptly, the image pick-up operation starts and all the first to sixth LEDs 6a to 6f are lit-on (refer to FIG. 25) (step S52). After starting the light-on operation of all the first to sixth LEDs 6a to 6f, the image pick-up operation by the CCD 8 starts (refer to FIG. 29) (step S53).

After ending the image pick-up operation by the CCD 8, then, all the first to sixth LEDs 6a to 6f are lit-off (step S54). The image data is read from the CCD 8, is converted into the digital data by the A/D converter 9, and is stored in the predetermined storage areas (first, third, and fifth memories) in the memory 11 via the bus 10 (step S55).

During setting the capturing mode of the monitoring image, the processing returns to step S51, the above-mentioned operations are repeated, and thus the moving image is captured.

The thus-obtained image is converted into the monitoring image data, and is displayed on the LCD monitor 16 via the monitor I/F 15. In this case, the monitoring image is displayed on the display 22 in the processing apparatus 2.

In the timing chart shown in FIG. 29, the power consumption is reduced by lighting-on and lighting-off the first to sixth LEDs 6a to 6f every image pick-up operation performed by the CCD 8. During setting the capturing mode of the monitoring image, the first to sixth LEDs 6a to 6f may be continuously lit-on.

Although not shown, the image capturing timing of the LEDs and the CCD is not limited to this and, identically, the LEDs may be lit-on after starting capturing the image by the image pick-up device and the operation for capturing the image by the image pick-up device may end after the light-off operation of the LEDs.

According to another method for capturing the monitoring image, the continuous capturing mode of the 6-band spectroscopic images enables the creation of the monitoring image by addition of memories of the first and second bands of the 6-band spectroscopic images, addition of memories of the third and fourth bands, and addition of memories of the fifth and sixth bands. In this case, the monitoring image is created only by addition of memories without changing the algorithm of the photographing portion. This is advantageous as a monitoring method upon measuring the continuous spectroscopic images.

Figure 30:
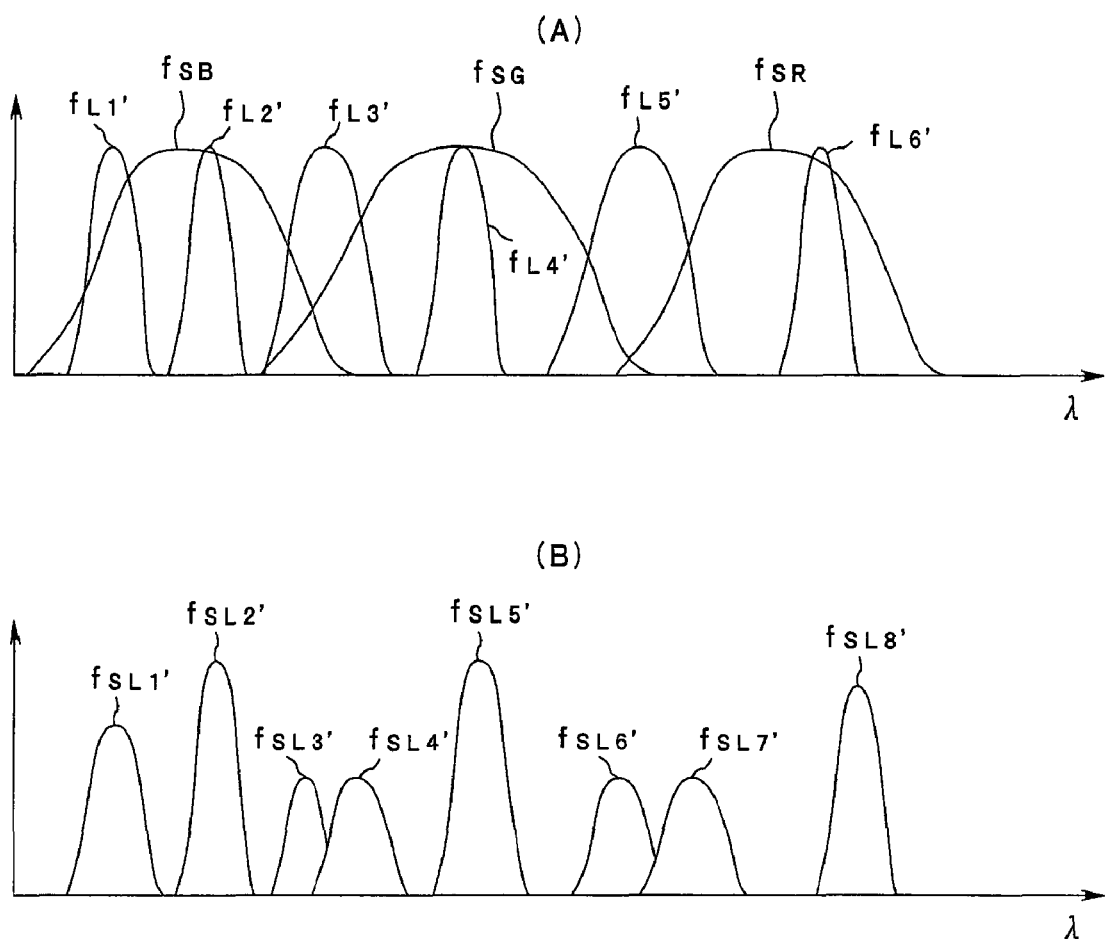
FIG. 30 is a graph showing light-emitting spectrums of the LEDs and the spectroscopic sensitivity characteristics of the CCD through a color filter array, upon creating 8-band spectroscopic images according to the third embodiment.

Next, FIGS. 30 to 36 relate to modifications of the third embodiment. FIG. 30 is a graph showing the light-emitting spectrums of the LEDs and the spectroscopic sensitivity characteristics of the CCD passed through a color filter array, upon creating the 8-band spectroscopic images.

According to one modification of the third embodiment, the LED is arranged with the light-emitting spectroscopic characteristics between the RGB bands detected by the CCD 8 via the color filter array 19. Thus, although the LEDs only emit the light of the six primary colors (6 bands), it is detected that the 8 band signals are outputted.

Referring to FIG. 30(A), with respect to the curves fSB, fSG, and fSR indicating the total spectroscopic sensitivity characteristics obtained by the transmittance distribution of the color filter array 19 and the light-receiving sensitivity distribution of the CCD 8, the spectroscopic characteristics of the light emission of the first to sixth LEDs 6a to 6f are as follows (shown by curves fL1' to fL6').

The curve fSB indicating the spectroscopic band area corresponding to the blue color filter includes the two curves fL1' and fL2', and further includes a part of the curve fL3'.

The curve fSG indicating the spectroscopic band area corresponding to the green color filter includes the curve fL4', and further includes a part of the curve fL3' and a part of the fL5'.

The curve fSR indicating the spectroscopic band area corresponding to the red color filter includes the curve fL6' and further includes a part of the curve fL5'.

As a consequence, the spectroscopic characteristics (curve fL3') of the light emission from the third LED 6c exist between the band through the blue color filter and the band through the green color filter. The spectroscopic characteristics (curve fL5') of the light emission from the fifth LED 6e exist between the band through the green color filter and the band through the red color filter.

With the above-mentioned configuration, referring to FIG. 30(B), the total spectroscopic sensitivity characteristics upon receiving the light emitted from the first to sixth LEDs 6a to 6f by the CCD 8 via the input button unit 19 is 8 bands including a curve fSL1' (formed by the curves fL1' and fSB), a curve fSL2' (formed by the curves fL2' and fSB), a curve fSL3' (formed by the curves fL3' and the curve fSB), a curve fSL4' (formed by the curves fL3' and fSG), a curve fSL5' (formed by the curves fL4' and fSG), a curve fSL6' (formed by the curves fL5' and fSG), curve fSL7' (formed by the curves fL5' and fSR), and a curve fSL8' (formed by the curves fL6' and fSR).

Figure 32:
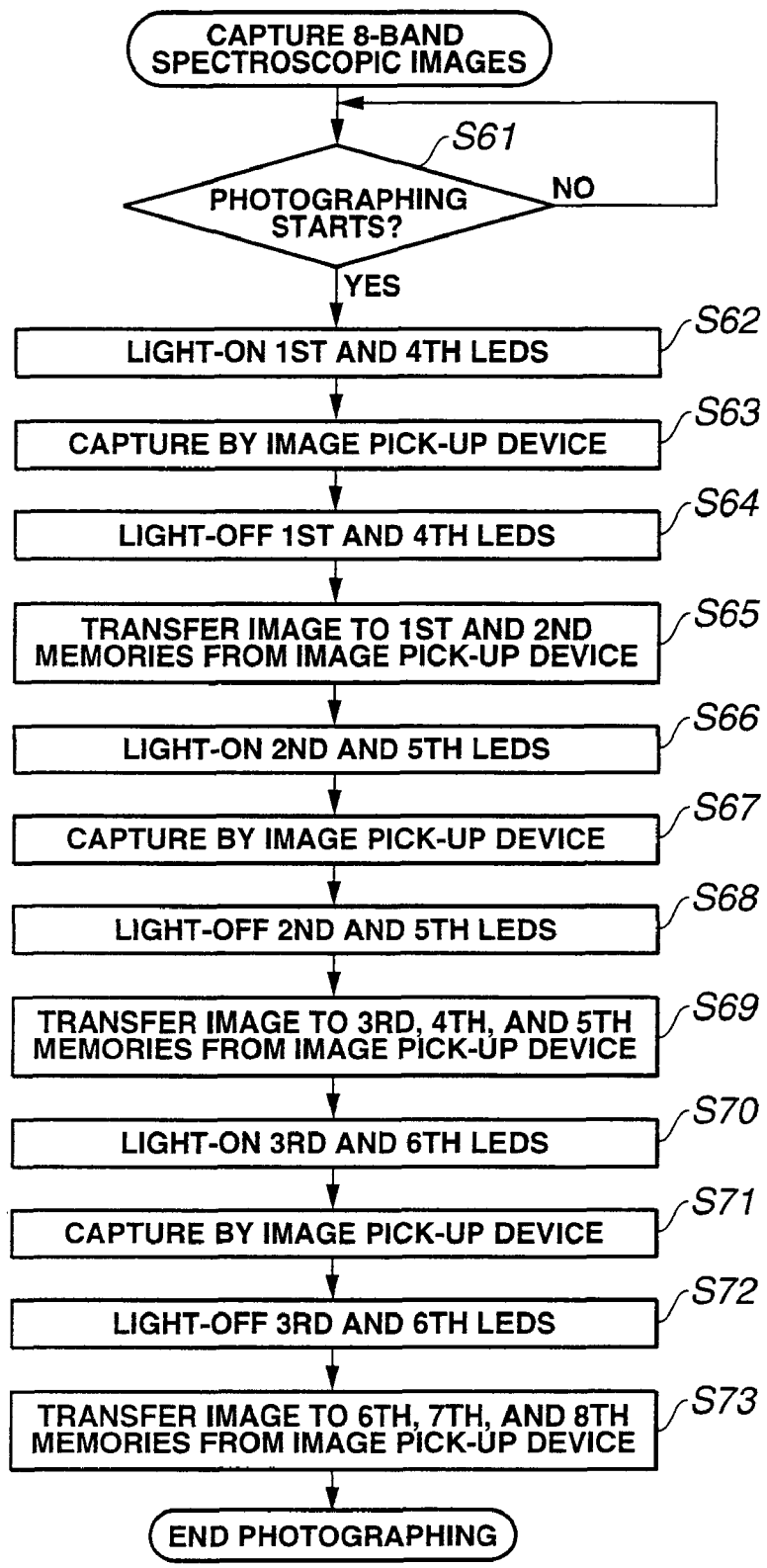
FIG. 32 is a flowchart showing the operation for light emission of the LEDs and for image capturing by the image pick-up device, upon capturing the 8-band spectroscopic images according to the third embodiment.
Figure 33:
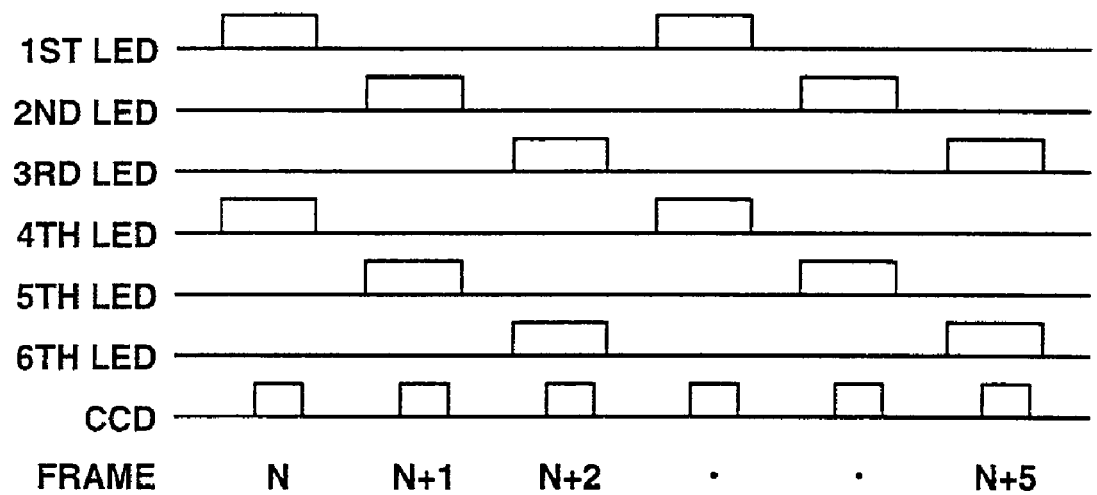
FIG. 33 is a timing chart showing a state of the operations for light emission of the LEDs and for image capturing by the image pick-up device, upon capturing the 8-band spectroscopic images according to the third embodiment.

Next, the operation for capturing the 8-band spectroscopic image will be described with reference to FIGS. 31 to 33. FIG. 31 is a graph showing the spectroscopic characteristics of the spectroscopic images of frames, upon creating the 8-band spectroscopic images. FIG. 32 is a flowchart showing the operation for light emission of the LEDs and for image capturing by the image pick-up device, upon capturing the 8-band spectroscopic images. FIG. 33 is a timing chart showing a state of the operations for light emission of the LEDs and for image capturing by the image pick-up device, upon capturing the 8-band spectroscopic images.

According to another modification of the third embodiment, the storage areas including first to eighth memories are arranged in the photographing apparatus 1 to pick-up the 8-band spectroscopic images.

The photographing button 14a is pressed and thus the mode is switched to the capturing mode of the spectroscopic image. Then, it is determined whether or not the image pick-up operation of the spectroscopic image starts (step S61).

The image pick-up operation of the spectroscopic image starts. Then, referring to FIG. 31(A), the operation for capturing the image of the frame N starts. The first LED 6a and the fourth LED 6d are simultaneously lit-on (step S62). After starting the light-on operation, the image pick-up operation of the CCD 8 starts (refer to FIG. 33) (step S63).

After the image pick-up operation of the CCD 8 ends, the first LED 6a and fourth LED 6d are lit-off (step S64). The image data is read from the CCD 8, is converted into the digital data by the A/D converter 9, and is stored in predetermined storage areas (first and second memories) in the memory 11 via the bus 10 (step S65). Thus, the operation for capturing the image of the frame N ends (operation for capturing the image of the 2-band subject spectroscopic images ends).

Next, referring to FIG. 31(B), the operation for capturing the image of the frame (N+1) starts, and the second LED 6b and the fifth LED 6e are simultaneously lit-on (step S66). After starting the light-on operation, the image pick-up operation by the CCD 8 starts (refer to FIG. 33) (step S67).

After the image pick-up operation of the CCD 8 ends, the second LED 6b and fifth LED 6e are lit-off (step S68). The image data is read from the CCD 8, and is stored in predetermined storage areas (third, fourth, and fifth memories) in the memory 11 (step S69). Thus, the operation for capturing the image of the frame (N+1) ends (operation for capturing the image of the 3-band subject spectroscopic images ends).

Further, referring to FIG. 31(C), the operation for capturing the image of the frame (N+2) starts, and the third LED 6c and the sixth LED 6f are simultaneously lit-on (step S70). After starting the light-on operation, the image pick-up operation by the CCD 8 starts (refer to FIG. 33) (step S71).

After the image pick-up operation of the CCD 8 ends, the third LED 6c and sixth LED 6f are lit-off (step S72). The image data is read from the CCD 8, and is stored in predetermined storage areas (sixth, seventh, and eighth memories) in the memory 11 (step S73). Thus, the operation for capturing the image of the frame (N+2) ends (operation for capturing the image of the 3-band subject spectroscopic images ends).

Upon continuously capturing the spectroscopic images like the moving image, the operation from the frame N to the frame (N+2) is repeated.

Although not shown, the image capturing timings of the LEDs and the CCD are not limited to the foregoing. Identically, the LEDs are lit-on after starting capturing the image by the image pick-up device and the image capturing by the image pick-up device ends after the light-off operation of the LEDs.

The 6-band subject spectroscopic images stored in the memory 11 are sent to the processing apparatus 2 and are subjected to the color reproduction and image processing by a processing program. The processing result is displayed on the display 22 by another processing program or is transferred to the photographing apparatus 1 and is displayed on the LCD monitor 16.

Figure 34:
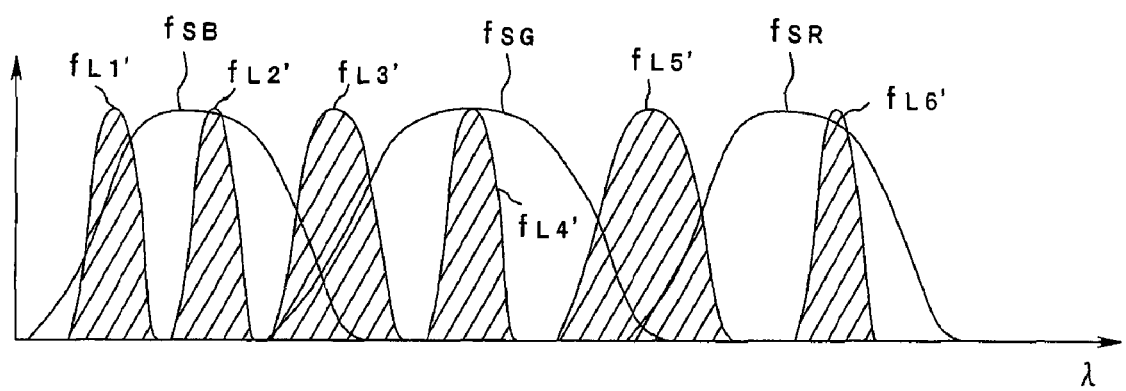
FIG. 34 is a graph showing the spectroscopic characteristics of the spectroscopic images every frame, upon creating the monitoring image according to the third embodiment.
Figure 35:
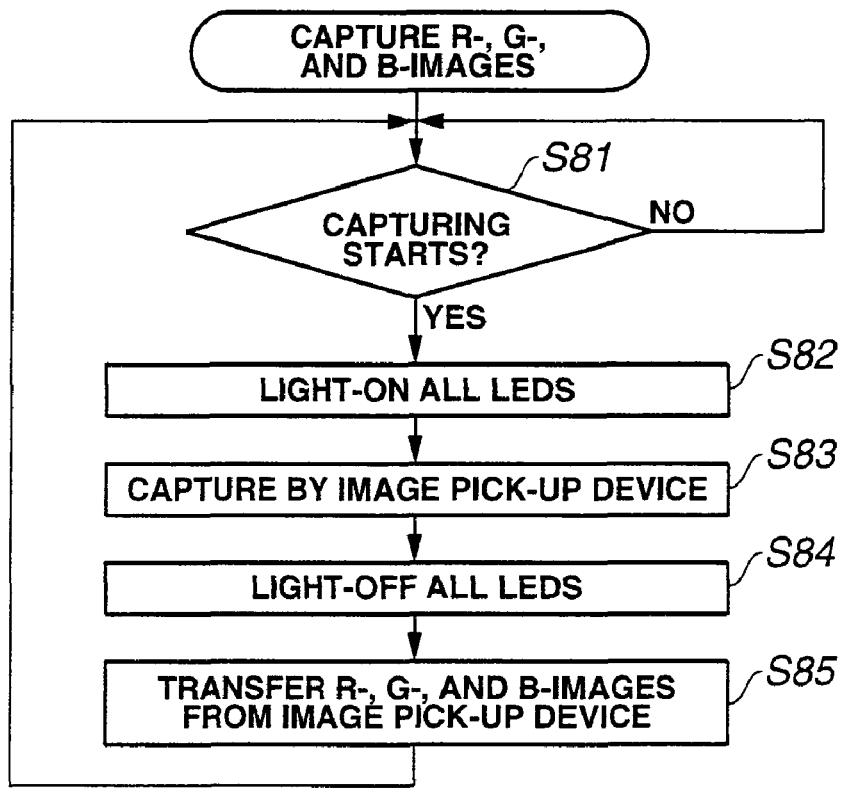
FIG. 35 is a flowchart showing the operations for light emission of the LEDs and for image capturing by the image pick-up device, upon capturing the monitoring image according to the third embodiment.
Figure 36:
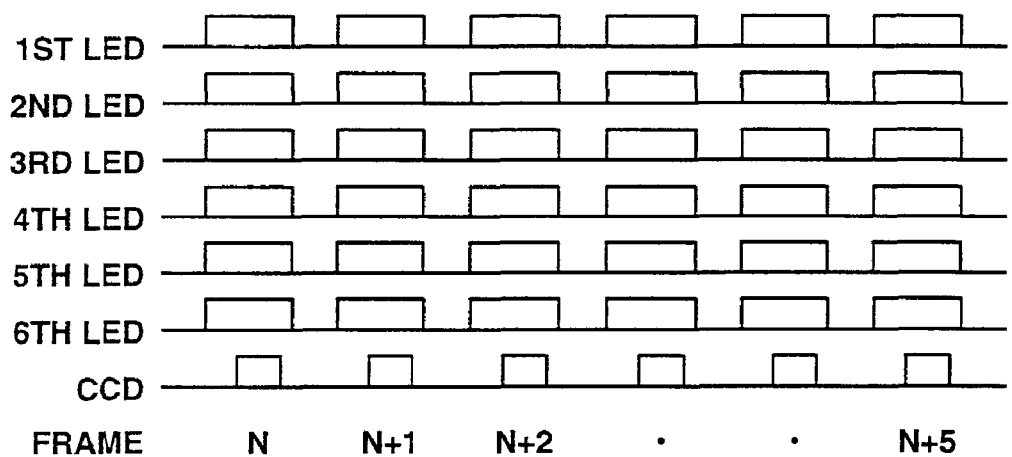
FIG. 36 is a timing cart showing states of the operations for light emission of the LEDs and for image capturing by the image pick-up device, upon capturing the monitoring image according to the third embodiment.

Next, a description is given of the operation of the capturing mode of the monitoring image with reference to FIGS. 34 to 36. FIG. 34 is a graph showing the spectroscopic characteristics of the spectroscopic images of the frames, upon creating the monitoring image. FIG. 35 is a flowchart showing the operations for light emission of the LEDs and for image capturing by the image pick-up device, upon capturing the monitoring image. FIG. 36 is a timing chart showing the state of the operations for light emission of the LEDs and for image capturing by the image pick-up device, upon capturing the monitoring image.

The power switch is turned on, thereby setting the capturing mode of the monitoring image. Alternatively, the capturing mode of the spectroscopic image ends, thereby returning the mode to the capturing mode of the monitoring image. Thus, the start for picking-up the monitoring image is waited (step S81).

Promptly, the image pick-up operation starts and all the first to sixth LEDs 6a to 6f are lit-on (refer to FIG. 34) (step S82). After starting the light-on operation of all the first to sixth LEDs 6a to 6f, the image pick-up operation by the CCD 8 starts (refer to FIG. 36) (step S83).

After ending the image pick-up operation by the CCD 8, then, all the first to sixth LEDs 6a to 6f are lit-off (step S84). The image data is read from the CCD 8, is converted into the digital data by the A/D converter 9, and is stored in a predetermined storage area in the memory 11 via the bus 10 (step S85).

Herein, the first to sixth LEDs 6a to 6f are lit-on and are lit-off every image pick-up operation by the CCD 8, thereby reducing the power consumption. However, similarly to the description with reference to FIG. 29, the first to sixth LEDs 6a to 6f may be continuously lit-on during setting the capturing mode of the monitoring image.

Although not shown, the image capturing timings of the LEDs and the CCD are not limited to the foregoing. Identically, the LEDs are lit-on after starting capturing the image by the image pick-up device and the image capturing by the image pick-up device ends after the light-off operation of the LEDs.

Until resetting the capturing mode of the monitoring image, the processing returns to step S81, then the above-mentioned operation is repeated, and the image data for moving image is continuously captured.

The captured images are converted into the monitoring image data, and are displayed on the LCD monitor 16 via the monitor I/F 15. In this case, by the setting, the monitoring image is displayed on the display 22 of the processing apparatus 2.

As mentioned above using an example, the image pick-up device is a simple-plate image pick-up device which is formed by the combination with the 3-band color filter array. However, the present invention is not limited to this and may be a three-plate 3-band image pick-up device comprising a spectroscopic unit, such as a spectroscopic mirror or spectroscopic prism, which performs the spectroscopy of the incident light into a plurality of wavelengths, and a plurality of image pick-up devices which pick-up the image of the light of the plurality of wavelength bands which are divided by the spectroscopic unit. Alternatively, the image pick-up devices may be a two-plate image pick-up device. Further, the color filter is not limited to a primary color system filter of three RGB bands and may be a complementary color system filter.

The 8-band subject spectroscopic image data is captured from the LEDs of the 6-band light-emitting spectrums. However, the present invention is not limited to this. Arbitrary subject spectroscopic image data may be captured by the combination. For example, the light source may be only the third LED and the fifth LED, namely, 2-band light source. In the case of the light source having the 2 bands, as shown by the curves fSL3', fSL4', fSL6' and fSL7', the 4-band subject spectroscopic images are captured. In addition, the light source may be used by various combination.

According to the third embodiment, the same advantages as those first and second embodiments are obtained. Further, the use of the color image pick-up device reduces the number of image pick-up times necessary for capturing the subject spectroscopic image, and the moving image is easily color-reproduced at the high fidelity level.

Further, the light-emitting spectrums of the LEDs exist over the spectroscopic sensitivity distributions of the light received by the color image pick-up device. Thus, the 8-band subject spectroscopic image data is captured by using the LEDs of the 6-band light-emitting spectrum.

Figure 37:
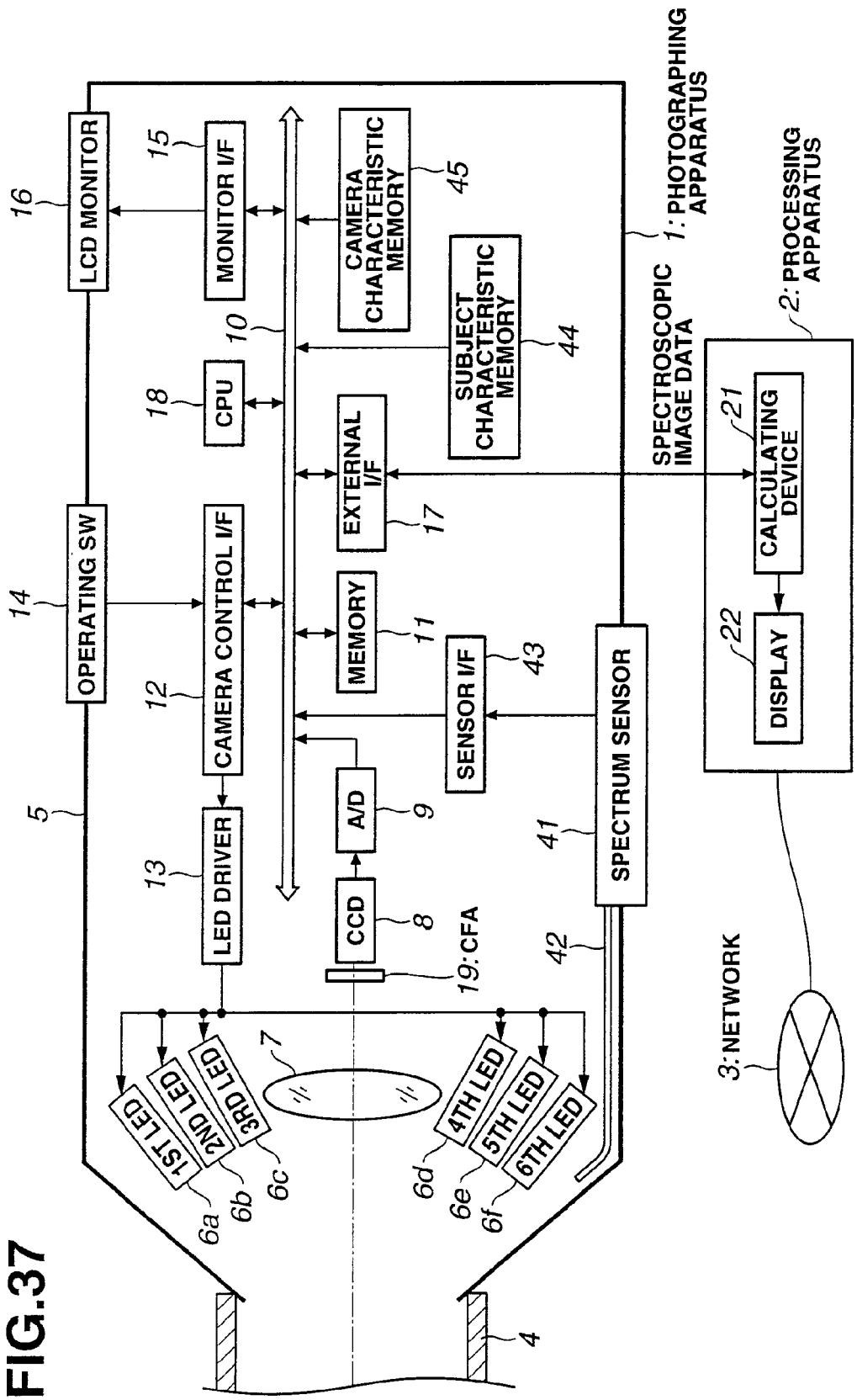
FIG. 37 is a block diagram showing the configuration of an image processing system according to the fourth embodiment of the present invention.

FIGS. 37 to 42 relate to the fourth embodiment of the present invention. FIG. 37 is a block diagram showing the configuration of an image processing system. According to the fourth embodiment, the same components as those according to the first to third embodiments are designated by the same reference numerals, a description thereof is omitted, and mainly different portions are described.

The fourth embodiment uses the basic configuration according to the third embodiment. Further, according to the fourth embodiment, the image processing system comprises a spectrum sensor.

Referring to FIG. 37, the photographing apparatus 1 in the image processing system comprises: a spectrum sensor 41 which senses the light spectrum distribution; a probe 42 which guides the sensed light to the spectrum sensor 41; a sensor I/F 43 which converts an output from the spectrum sensor 41 into a digital signal, processes it, and outputs it; a subject characteristic memory 44 which stores the subject characteristic; and a camera characteristic memory 45 which stores camera characteristic, in addition to the configuration according to the third embodiment shown in FIG. 21.

The spectrum sensor 41 senses only the spectrum, not capturing the light as the image, different from the configuration for capturing the 6-band spectroscopic image by the CCD 8 with the first to sixth LEDs 6a to 6f.

The spectrum sensor 41 covers the entire range of the visible light serving as the light sensing range (380 nm to 800 nm), sensors the spectrum by a grating method with a resolution of 5 nm. Thus, the specific spectrum data can be captured. Although the grating-method spectrum sensor is used as an example, the spectrum sensor 41 may be another.

The probe 42 uses a flexible optical fiber (or optical fiber bundle). However, the probe 42 is not limited to this and any probe for guiding the sensed light can be widely used.

With the above-mentioned configuration, the optical spectrum can be sensed by sensing the light from the subject. In the meantime, a standard white board is used in place of the subject, thereby measuring the spectrum characteristic of the illuminating light.

Specifically, external illuminating light is shielded by using the abutting portion 4 or the like and the spectrum is sensed by sequentially emitting the light of the first to sixth LEDs 6a to 6f. Thus, the spectrum characteristics of the first to sixth LEDs 6a to 6f are estimated. The degradation of the light-emitting device and the change in spectrum characteristics due to the environmental change of the temperature are sensed. Further, since the profile of the illuminating spectrum which reflects the characteristic change, the color is accurately reproduced at the high fidelity level.

Further, the ambient illuminating light is sensed and the spectrum characteristics of the exterior lighting are measured.

Figure 38:
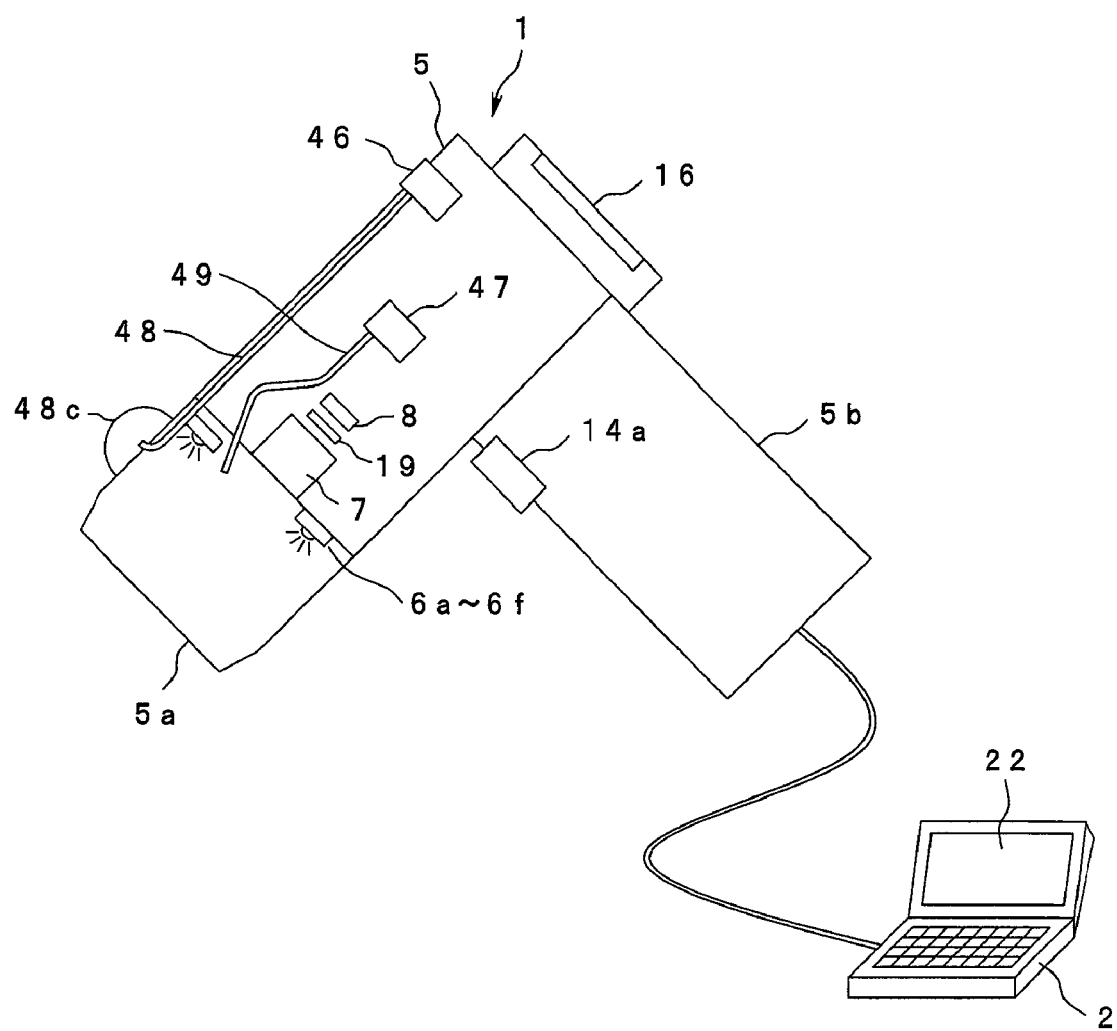
FIG. 38 is a diagram showing an example state of using the image processing system comprising a plurality of spectrum sensors according to the fourth embodiment.

Next, FIG. 38 is a diagram showing one example of a state of using the image processing system having a plurality of spectrum sensors.

Referring to FIG. 38, the specific arrangement of the spectrum sensor is shown. Here, two spectrum sensors, namely, a first spectrum sensor 47 and a second spectrum sensor 46 are used.

The first spectrum sensor 47 is arranged to sense the spectroscopic spectrum of the subject portion, and the tip of an optical fiber 49 serving as a probe is arranged at the incident position of the subject light via the projecting port 5a of the casing 5, near the first to sixth LEDs 6a to 6f.

As mentioned above, the first spectrum sensor 47 has the standard white board arranged, in place of the subject, thereby being used to sense the illuminating spectrums of the first to sixth LEDs 6a to 6f. Further, the tip of the first spectrum sensor 47 has a lens or the like as will be described later, thereby directly capturing spectroscopic reflecting spectrums of a spot (specific portion) of the subject.

Thus, the spectrum data such as the painting color of a vehicle, painting color of the building, spectroscopic characteristics of food, or dyeing of the cloths is directly obtained and is used as data for examination and confirmation.

The second spectrum sensor 46 is arranged to sense the illuminating light spectrum of the environment under which the subject is placed. The tip of an optical fiber 48 as a probe is exposed to the outer surface of the casing 5. Further, an integrating sphere 48c which is white and semi-transparent covers the tip of the optical fiber 48. The use of the second spectrum sensor 46 enables the capturing of the illuminating spectrums upon photographing the subject apart from the photographing apparatus 1 only with sunlight or room light. Thus, simultaneously with the photographing operation of the subject image, the profile of the illuminating spectrum of the ambient illuminating light in this case can be created. Therefore, if the ambient illuminating light changes, in accordance therewith, the color is automatically reproduced at the high fidelity level in real time.

Further, the spectrum of ambient light of the photographing apparatus 1 is sensed and is compared with the spectrums of the LEDs included in the photographing apparatus 1. Thus, the ambient light and the LED light are adaptively switched for the image pick-up operation. For example, the ambient light is used upon picking-up the moving images of RGB. In this case, the power consumption is reduced by not emitting the light of the LED in the photographing apparatus 1.

Figure 39:
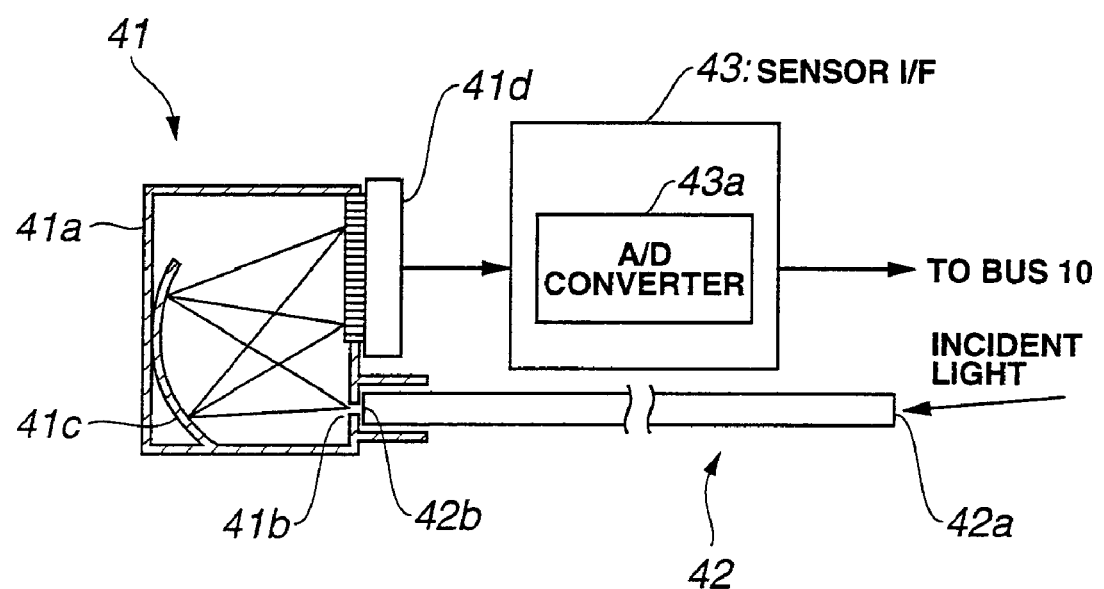
FIG. 39 is a sectional view showing an example configuration of the spectrum sensor according to the fourth embodiment.

FIG. 39 is a sectional view showing an example configuration of the spectrum sensor 41.

In the probe 42, the light is incident on an incident end 42a, and the light is outputted from an output end 42b.

The spectrum sensor 41 comprises: a box 41a; an incident-light slit 41b which is arranged as an opening at one end of the box 41a and on which the light is outputted from the output end 42b of the probe 42 serving as slit light; a grating 41c which is arranged in the box 41a, performs the stereoscopy of the slit light incident from the incident-light slit 41b in accordance with the wavelength, and reflects in the different directions and collects the light; and a photodiode array 41d which is attached to the box 41a, receives the light collected at positions varied depending on the wavelengths by the grating 41c, and outputs a signal in accordance with the strength of the received light.

Thus, the photodiode array 41d photoelectrically converts the light with the wavelengths varied depending on the light receiving positions, and outputs the signal in accordance with the strength.

The sensor 43 comprises an A/D converter 43a which converts an analog signal outputted from the photodiode array 41d into a digital signal. The digital signal after the conversion is outputted to the CPU 18 or the like via the bus 10. The CPU 18 receives the digital signal as spectrum information indicating the strength of the wavelength, and analyzes the information.

Figure 40:
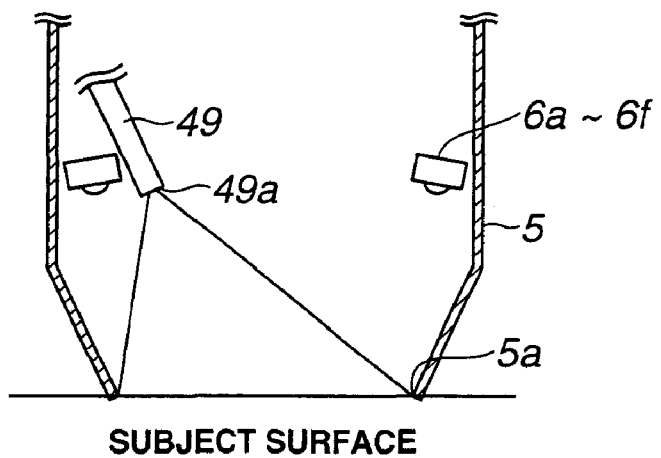
FIG. 40 is a sectional view showing a state of an incident end of an optical fiber connected to the spectrum sensor according to the fourth embodiment.

FIG. 40 is a sectional view showing a state of an incident end 49a of the optical fiber 49 connected to the first spectrum sensor 47. Referring to FIG. 40, the image pick-up optical system 7 and the like are not shown.

The light from an angle range is incident on the incident end 49a of the optical fiber 49. In the example shown in FIG. 40, the reflecting light from the subject surface serving as the photographing target, incident via the projecting port 5a of the casing 5, reaches the incident end 49a.

With the configuration shown in FIG. 40, the standard white board is used as the subject, the spectrums of the LED illumination are sensed and information on the color change due to the aging change is obtained.

Figure 41:
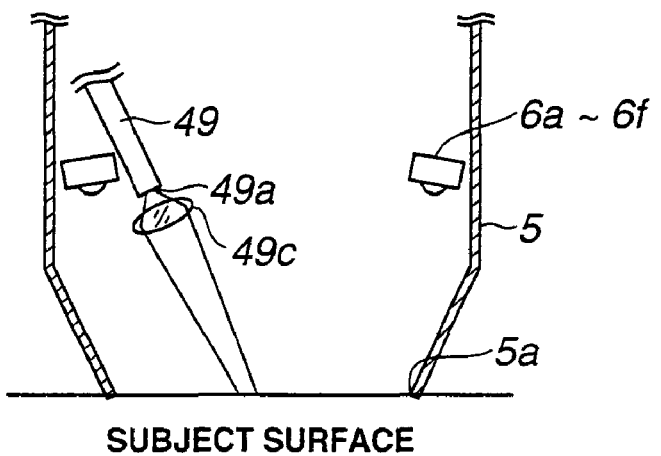
FIG. 41 is a sectional view showing an example configuration for arranging an optical system for sensor near the incident end of the optical fiber connected to the spectrum sensor according to the fourth embodiment.

FIG. 41 is a sectional view showing an example configuration of arranging an optical system 49c for sensor near the incident end 49a of the optical fiber 49 connected to the spectrum sensor 47. Referring to FIG. 41, the image pick-up optical system 7 and the like are not shown.

Referring to FIG. 41, the optical system 49c for sensor comprising a lens and the like are arranged to the incident end 49a of the optical fiber 49 connected to the first spectrum sensor 47. Therefore, beams incident on the incident end 49a are limited to the light from a range of the subject. As mentioned above, the spectrum at the specific position of the subject is measured with the resolution of the high wavelength.

Figure 42:
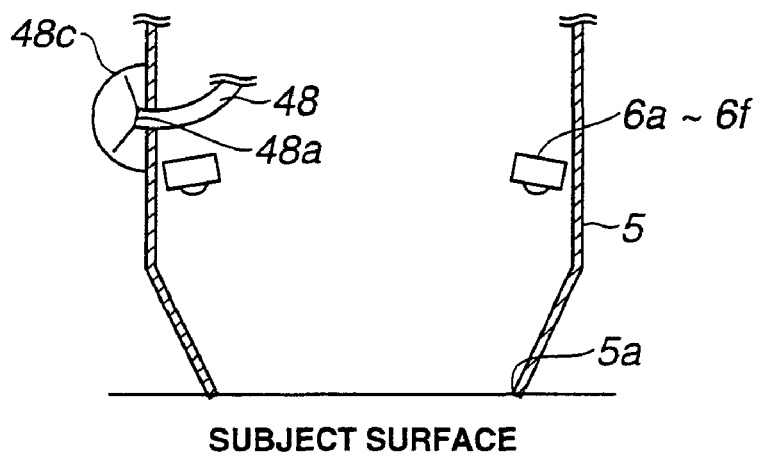
FIG. 42 is a sectional view showing a state of the incident end of the optical fiber connected to the spectrum sensor arranged for obtaining ambient light according to the fourth embodiment.

FIG. 42 is a sectional view showing a state of an incident end 48a of the optical fiber 48 connected to the second spectrum sensor 46 arranged for capturing the ambient light. Referring to FIG. 42, the image pick-up optical system 7 and the like are not shown.

As mentioned above, the incident end 48a of the optical fiber 48 for input is exposed to the outer surface of the casing 5 and has the integrating sphere 48c which is white and is semi-transparent to surround the incident end 48a.

With the above-mentioned configuration, the ambient illuminating light is illuminated to the integrating sphere 48c, thus, the light is diffused and passed, and the light is incident on the incident end 48a of the optical fiber 48. The incident light is transmitted by the optical fiber 48 and the spectrums are measured by the second spectrum sensor 46.

According to the fourth embodiment, the same advantages as those according to the first to third embodiments are obtained. The spectrum sensor is arranged. Thus, the spectrum distribution of the subject light is obtained, the spectrum distribution of the LEDs is obtained, and the color is accurately reproduced in real time.

The use of the optical system for sensor enables the spectrum distribution of the specific portion of the subject to be obtained. As mentioned above, the optical system for sensor has the resolution of 5 nm. Therefore, it is possible to obtain the specific spectrum data of the specific portion of the subject and the detailed diagnosis or determination is performed by the obtained data.

Further, the profile of the illuminating spectrum of the ambient illuminating light is obtained in real time because the spectrum of the ambient illuminating light can be sensed.

The present invention is not limited to the above embodiments and can be variously modified without departing the essentials of the present invention.

INDUSTRIAL APPLICABILITY

According to the image processing system of the present invention, as mentioned above, the image processing system with the compact and mobile size and light weight reproduces the colors at the high fidelity level.

What is claimed is:

1. A photographing apparatus comprising:
   a plurality of light-emitting devices for illuminating a subject and emitting illumination light having characteristics of spectroscopic distributions varied in at least a visible light range;
   an image pick-up optical system which forms a subject image of a subject illuminated by the light-emitting device;
   an image pick-up device unit which picks-up the subject image formed by the image pick-up optical system and outputs an image signal; and
   a control unit which controls lighting-on of the plurality of light-emitting devices and image picking-up by the image pick-up device unit;
   wherein the photographing apparatus is configured to switch between a spectroscopic image capturing mode for capturing multi-band spectroscopic still images of the subject and a moving image capturing mode for capturing a moving image;
   wherein in the spectroscopic image capturing mode, the control unit controls the plurality of light emitting devices to sequentially light-on according to the characteristics of spectroscopic distributions, and controls the image pick up device unit to perform a plurality of equential image pick-up operations synchronously with the lighting-on of the light emitting devices to capture multi-band sequential spectroscopic images of the subject; and
   wherein in the moving image capturing mode, the control unit one of: (i) controls light emitting devices of a single specific primary color or a plurality of specific primary colors selected from the plurality of light emitting devices to light-on sequentially or simultaneously, and (ii) controls a plurality of groups of the light-emitting devices to sequentially light-on group by group, the groups including light-emitting devices having different characteristics of spectroscopic distributions selected from the plurality of light-emitting devices, and the control unit controls the image pick-up device unit to capture a moving image.

2. The photographing apparatus according to claim 1, wherein the control unit performs the control by using groups necessary for application in the plurality of groups of the light-emitting devices which respectively comprise the plurality of the light-emitting devices.

3. The photographing apparatus according to claim 1, wherein the moving image capturing mode is a mode for capturing a three-primary-color moving image by the image pick-up device unit by sequentially lighting-on groups of the light-emitting devices for every image pick-up frame in the group of the light-emitting devices comprising a group of the light-emitting devices of blue in the visible light area, a group of the light-emitting devices of red in the visible light area, and a group of the light-emitting devices of green in the visible light area, from among the plurality of light-emitting devices.

4. The photographing apparatus of claim 2, further comprising a photographing operating unit which inputs at least an instruction for starting a spectroscopic image photographing operation, wherein the control unit controls the operation for capturing the plurality of subject spectroscopic images in accordance with the input of the instruction for starting the spectroscopic image photographing operation from the photographing operating unit.

5. The photographing apparatus according to claim 4, wherein the photographing operating unit comprises a pressing button switch, and the control unit controls the operation for changing the group upon pressing of the button switch.

6. The photographing apparatus according to claim 5, wherein the control unit controls light-on timings of the devices of the changed group, upon pressing of the button switch.

7. The photographing apparatus according to claim 4, wherein the photographing operating unit comprises a pressing button switch, and the control unit controls the switching of the spectroscopic image capturing mode and the moving image capturing mode.

8. The photographing apparatus according to claim 1, wherein the image pick-up device unit comprises a color image pick-up device having a color filter array.

9. The photographing apparatus according to claim 8, wherein at least one of the plurality of light-emitting devices has characteristics of spectroscopic distributions between different bands of the color filter array.

10. The photographing apparatus according to claim 1, further comprising a display unit for displaying an image based on the image signal outputted from the image pick-up device unit.

11. The photographing apparatus according to claim 1, further comprising an abutting portion which is abutted to the subject at one end thereof.

12. The photographing apparatus according to claim 11, wherein the abutting portion comprises a flexible material with a cylindrical shape.

13. The photographing apparatus according to claim 11, wherein the abutting portion comprises a material which rejects or reduces influence from ambient light.

14. The photographing apparatus according to claim 11, wherein the abutting portion is detachably coupled to a casing of the photographing apparatus.

15. An image processing system comprising:
   a photographing apparatus according to claim 1; and
   a processing apparatus including a calculating unit which performs a desired image calculation based on the image signal.

16. The image processing system according to claim 15, wherein the calculating unit comprises a color-reproduction calculating unit for calculating image data for displaying an image of the subject which is color-reproduced based on the spectroscopic still images photographed by the photographing apparatus.

17. The image processing system according to claim 16, wherein the calculating unit further comprises an input profile calculating unit for generating an input profile using at least one of the characteristics of spectroscopic distributions of the light-emitting devices, and characteristics data of the image pick-up optical system and the image pick-up device unit, and
   wherein the color-reproduction calculating unit comprises an XYZ estimation calculating unit for generating image data of XYZ tristimulus values from the spectroscopic still images using the input profile and a color matching function.

18. The image processing system according to claim 15, wherein the calculating unit further comprises an image determination calculating unit which determines or analyzes the subject based on the spectroscopic still images and outputs a result of the determining or analyzing.

* * * * *